United States Patent
Montenegro et al.

(10) Patent No.: US 8,557,142 B2
(45) Date of Patent: Oct. 15, 2013

(54) COMPOUNDS FOR A LIQUID CRYSTAL MEDIUM AND HIGH-FREQUENCY COMPONENTS CONTAINING SAID LIQUID CRYSTAL MEDIUM

(75) Inventors: Elvira Montenegro, Weinheim (DE);
Christian Jasper, Darmstadt (DE);
Detlef Pauluth, Ober-Ramstadt (DE);
Volker Reiffenrath, Rossdorf (DE);
Atsutaka Manabe, Bensheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 13/497,909

(22) PCT Filed: Sep. 1, 2010

(86) PCT No.: PCT/EP2010/005371
§ 371 (c)(1),
(2), (4) Date: Mar. 23, 2012

(87) PCT Pub. No.: WO2011/035849
PCT Pub. Date: Mar. 31, 2011

(65) Prior Publication Data
US 2012/0205583 A1     Aug. 16, 2012

(30) Foreign Application Priority Data
Sep. 25, 2009    (DE) .......................... 10 2009 042 729

(51) Int. Cl.
| | |
|---|---|
| *C09K 19/30* | (2006.01) |
| *C09K 19/06* | (2006.01) |
| *C09K 19/52* | (2006.01) |
| *C09K 19/00* | (2006.01) |
| *C07C 19/08* | (2006.01) |
| *C07C 22/00* | (2006.01) |
| *C07C 25/00* | (2006.01) |
| *C07C 25/13* | (2006.01) |
| *C07C 15/12* | (2006.01) |
| *H01Q 21/00* | (2006.01) |

(52) U.S. Cl.
USPC .............. 252/299.63; 252/299.01; 252/299.6; 428/1.1; 349/182; 343/893; 568/631; 570/128; 570/184; 585/251

(58) Field of Classification Search
USPC .............. 252/299.01, 299.6, 299.63; 428/1.1; 349/182; 343/893; 568/631; 570/128; 570/184; 585/25
See application file for complete search history.

(56) References Cited

U.S. PATENT DOCUMENTS

| | | |
|---|---|---|
| 5,759,443 A | 6/1998 | Funfschilling et al. |
| 6,149,837 A | 11/2000 | Sekine et al. |
| 6,623,810 B2 | 9/2003 | Sekine et al. |
| 7,361,288 B2 | 4/2008 | Lussem et al. |
| 8,197,710 B2 | 6/2012 | Hamada et al. |
| 2012/0182200 A1* | 7/2012 | Manabe et al. ............... 343/893 |

FOREIGN PATENT DOCUMENTS

| | | |
|---|---|---|
| DE | 199 07 941 | 8/1999 |
| DE | 101 20 024 | 11/2001 |
| DE | 10 2004 029 429 | 2/2005 |
| EP | 2 067 796 | 6/2009 |
| GB | 2 334 718 | 9/1999 |
| JP | 4301379 | 10/1993 |
| JP | 2000 204052 | 7/2000 |

OTHER PUBLICATIONS

Dabrowski, R. et al., "3.3: High Birefringent Liquid Crystalline Materials," IDRC, 2008, pp. 35-38.
Dubois, F. et al., "Large Microwave Birefringence Liquid-Crystal Characterization for Phase-Shifter Applications," Japanese Journal of Applied Physics, 2008, vol. 47, No. 5, pp. 3564-3567.
Gaebler, A. et al., "Liquid Crystal-Reconfigurable Antenna Concepts for Space Applications at Microwave and Millimeter Waves," International Journal of Antennas and Propagation, 2009.
Goelden, F. et al., "Novel tunable liquid crystal phase shifter for microwave frequencies," 2 pages, 2000.
Hsu, C. S. et al., "Synthesis of laterally substituted bistolane liquid crystals," Liquid Crystals, 2000, vol. 27, No. 2, pp. 283-287.
Ind Technol Res Inst, "Triphenylene diacetylene compound, and liquid crystal composition containing the compound and liquid crystal display," Patent Abstracts of Japan, Publication Date: Jul. 25, 2000; English Abstract of JP-2000 204052.
International Search Report for PCT/EP2010/005371 dated Dec. 2, 2010.
Liao, Y. M. et al., "High Birefringence Isothiocyanato Bistolane Liquid Crystals for Display Application," IDMC, 2005, pp. 589-592.
Penirschke, A. et al., "Cavity Perturbation Method for Characterization of Liquid Crystals up to 35 GHz," 34th European Microwave Conference, 2004, pp. 545-548.
Sumitomo Chemical Co., "Phenylacetylene compound having skelton end cyclohexyl group, liquid crystal composition containing the compound, and liquid crystal element using the compound," Espacenet, Publication Date: Oct. 10, 2000; English Abstract of JP-4301379.
Tsai, W. L. et al., "Preliminary communication mesogenic properties of cycloalkylmethyl 4-(4'-octoxybiphenyl-4-carbonyloxy) benzoate," Liquid Crystals, Feb. 2004, vol. 31, No. 2, pp. 299-300.
Wu, S. T. et al., "High birefringence and wide nematic range bistolane crystals," Applied Physics Letters, Jan. 18, 1999, vol. 74, No. 3, pp. 344-346.

* cited by examiner

*Primary Examiner* — Geraldina Visconti
(74) *Attorney, Agent, or Firm* — Millen, White, Zelano & Branigan, P.C.

(57) ABSTRACT

The present invention relates to bistolans of the formula I

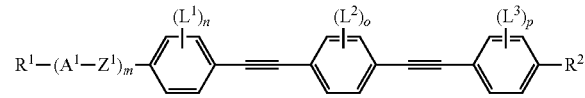

where one or more of the radicals $L^1$ to $L^3$ denote an $R^x$, where $R^x$ denotes cyclopropyl, cyclobutyl, cyclopentyl or cyclohexyl, and the other parameters are as defined in Claim 1. The invention also encompasses liquid-crystalline media which comprise the title compounds, to components for high-frequency technology which comprise these media, in particular phase shifters and microwave array antennae.

16 Claims, No Drawings

COMPOUNDS FOR A LIQUID CRYSTAL MEDIUM AND HIGH-FREQUENCY COMPONENTS CONTAINING SAID LIQUID CRYSTAL MEDIUM

The present invention relates to novel chemical compounds, to liquid-crystalline media composed thereof and to high-frequency components comprising these media, in particular antennae, especially for the gigahertz range. The liquid-crystalline media serve, for example, for the phase shifting of microwaves for tuneable "phased-array" antennae or for tuneable cells of microwave antennae based on "reflectarrays".

Liquid-crystalline media have been used for some time in electro-optical displays (liquid crystal displays—LCDs) in order to display information.

Recently, however, liquid-crystalline media have also been proposed for use in components for microwave technology, such as, for example, in DE 10 2004 029 429 A and in JP 2005-120208 (A).

An industrially valuable application of liquid-crystalline media in high-frequency technology is based on their property that their dielectric properties can be controlled, particularly for the gigahertz range, by a variable voltage. This enables the construction of tuneable antennae which do not contain any moving parts (A. Gaebler, A. Moessinger, F. Goelden, et al., "Liquid Crystal-Reconfigurable Antenna Concepts for Space Applications at Microwave and Millimeter Waves", International Journal of Antennas and Propagation, Vol. 2009 (2009), article ID 876989, 7 pages, doi: 10.1155/2009/876989).

A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548, describe, inter alia, the properties of the known single liquid-crystalline substance K15 (Merck KGaA, Germany) at a frequency of 9 GHz.

1-(Phenylethynyl)tolans, also called bistolan compounds below, having an alkyl substitution on the central phenylene ring are known to the person skilled in the art. For example, Wu, S.-T., Hsu, C.-S., Shyu, K.-F., Appl. Phys. Lett., 74 (3), (1999), 344-346, disclose various liquid-crystalline bistolan compounds containing a lateral methyl group, of the formula

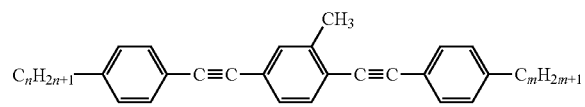

Hsu, C. S. Shyu, K. F., Chuang, Y. Y. and Wu, S.-T., Liq. Cryst., 27 (2), (2000), 283-287 also discloses, besides these liquid-crystalline bistolan compounds containing a lateral methyl group, corresponding compounds containing a lateral ethyl group and proposes the use thereof, inter alia, in liquid crystal optically phased arrays.

Dabrowski, R., Kula, P., Gauza, S., Dziadiszek, J., Urban, S, and Wu, S.-T., IDRC 08, (2008), 35-38, mentions dielectrically neutral bistolan compounds with and without a lateral methyl group on the central ring besides strongly dielectrically positive isothiocyanatobistolan compounds of the formula

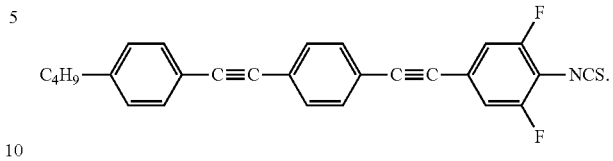

DE 10 2004 029 429 A describes the use of conventional liquid-crystal media in microwave technology, inter alia in phase shifters. This document has already investigated liquid-crystalline media with respect to their properties in the corresponding frequency range.

However, the compositions or individual compounds known to date are generally afflicted with disadvantages. Most of them result, besides other deficiencies, in disadvantageously high losses and/or inadequate phase shifts or inadequate material quality.

For use in high-frequency technology, liquid-crystalline media having particular, hitherto rather unusual, uncommon properties, or combinations of properties, are required.

Novel components for liquid-crystalline media having improved properties are thus necessary. In particular, the loss in the microwave range must be reduced and the material quality ($\eta$) improved.

In addition, there is a demand for an improvement in the low-temperature behaviour of the components. An improvement in both the operating properties and also in the shelf life is necessary here.

Thus, there is a considerable demand for liquid-crystalline media having suitable properties for corresponding practical applications.

Surprisingly, it has now been found that it is possible, using the compounds according to the invention, to achieve liquid-crystalline media having a suitable, nematic phase range and high $\Delta n$ which do not have the disadvantages of the prior-art materials, or at least only do so to a considerably reduced extent.

The invention relates to compounds of the formula I, also called bistolans below,

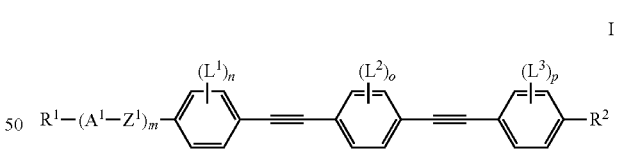

in which
$L^1$ to $L^3$ denote F, Cl, $C_1$- to $C_{1-10}$-alkyl or a meaning in accordance with $R^x$, where one or more of the radicals $L^1$ to $L^3$ denote an $R^x$,
n, o, p independently denote 0, 1, 2, 3 or 4, preferably 0 or 1,
$R^x$ denotes cyclopropyl, cyclobutyl, cyclopentyl or cyclohexyl,
$R^1$ and $R^2$, independently of one another, denote H, a halogenated or unsubstituted alkyl radical having 1 to 15 C atoms, where, in addition, one or more $CH_2$ groups in these radicals may each be replaced, independently of one another, by —C≡C—, —CH═CH—, —CF═CF—, —(CO)O—, —O(CO)—, —(CO)— or —O— in such a way that O atoms are not linked directly to one another, F, Cl, Br, CN, $CF_3$, $OCF_3$, SCN, NCS or $SF_5$, $A^1$ denotes a) trans-1,4-cyclohexylene or cyclohexenylene, in which, in addition, one or two non-adjacent $CH_2$ groups may be replaced by —O— and/or —S— and in which H may be replaced by F, b) 1,4-phenylene, in which one or two CH groups may be replaced by N and in which, in addition, one or more H atoms may be replaced by Br, Cl, F, CN, $R^x$, $C_1$-$C_{10}$ alkyl, $C_1$-$C_{10}$ alkoxy or a mono- or polyfluorinated $C_1$-$C_{10}$ alkyl or alkoxy group, or c) a radical from the group 1,4-bicyclo[2.2.2]octylene, cyclobut-1,3-diyl, spiro[3.3]heptane-2,6-diyl, thiophene-2,5-diyl,

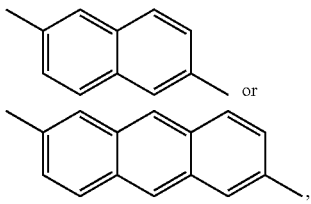

in which one or more CH groups may be replaced by N, one or more H atoms may be replaced by Br, Cl, F, CN, $R^x$, $C_1$-$C_{10}$ alkyl, $C_1$-$C_{10}$ alkoxy or a mono- or polyfluorinated $C_1$-$C_{10}$ alkyl or alkoxy group, and one or more double bonds may be replaced by single bonds, $Z^1$ denotes a single bond, —C≡C—, —CH═CH—, —$CH_2$O—, —(CO)O—, —$CF_2$O—, —$CF_2CF_2$—, —$CH_2CF_2$—, —$CH_2CH_2$—, —$(CH_2)_4$—, —CH═CF— or —CF═CF—, where asymmetrical bridges may be oriented to both sides, preferably a single bond, —C≡C—, —CH═CH— or —CF═CF—, and m denotes 0, 1 or 2.

The compounds according to the invention have a high clearing point, an extremely high optical anisotropy (Δn) and an advantageously high rotational viscosity. These properties make them particularly suitable for use in components for high-frequency technology, in particular in liquid-crystalline phase shifters having low loss.

The radicals $L^{1-3}$ preferably denote H, F, alkyl ($C_1$-$C_{10}$) or $R^x$. Preferably, 1, 2, 3 or 4 of the radicals $L^1$ to $L^3$ denote a radical selected from cyclopropyl, cyclobutyl, cyclopentyl and cyclohexyl ($R^x$). Particularly preferably, 1 to 2, in particular one, of the radicals $L^1$ to $L^3$ denote a radical selected from $R^x$.

Of the cycloaliphatic rings $R^x$, preference is given to cyclopropyl, cyclobutyl or cyclopentyl, particularly preferably cyclopropyl or cyclobutyl and very particularly preferably cyclopropyl.

The one radical $R^x$ or at least one of the radicals $R^x$ present is preferably localised on the central ring of the bistolan, i.e. in the position of one or more of the radicals $L^2$. This means that o is preferably >0 and at least one $L^2$=$R^x$. Particularly preferably n or p=0, very particularly preferably n and p=0. Particularly preferably precisely one radical $L^2$ is a radical $R^x$. It is furthermore preferred for 2 or 3 radicals $R^x$ present to be distributed over the three rings of the bistolan, i.e. over $L^1$-$L^3$.

Preferred compounds of the formula I are compounds of the formula IA

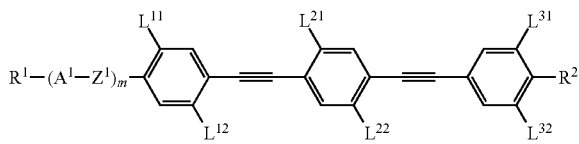

IA in which $L^{11}$ to $L^{32}$ are defined like $L^{1-3}$ for formula I and additionally denote hydrogen, preferably H, $R^x$, $CH_3$, $C_2H_5$ or F.

In the formula IA, at least one of the groups $L^{12}$ and $L^{21}$ preferably denotes a hydrogen. Particularly preferably, at least $L^{11}$, $L^{21}$ and $L^{31}$ are hydrogen. Furthermore, it is particularly preferred for one of $L^{12}$ and $L^{32}$ to be a hydrogen.

The index m is preferably 0 or 1, particularly preferably 0. If $A^1$ or $Z^1$ occurs more than once (m=2), the radicals may, independently of one another, adopt different meanings.

The ring group $A^1$ is preferably a 1,4-phenylene, in which, in addition, one or more H atoms may be replaced by Br, Cl, F, CN, $C_1$-$C_{10}$ alkyl, $R^x$, methoxy or a mono- or polyfluorinated methyl or methoxy group.

The bridging group $Z^1$ is preferably a single bond or —C≡C—.

One of the radicals $R^1$ or $R^2$ preferably denotes an alkyl radical having 1 to 15 C atoms, where, in addition, one or more $CH_2$ groups in these radicals may each be replaced, independently of one another, by —C≡C—, —CH═CH—, —(CO)O—, —O(CO)—, —(CO)— or —O— in such a way that O atoms are not linked directly to one another.

Preferred embodiments of the invention are therefore selected from the following structures:

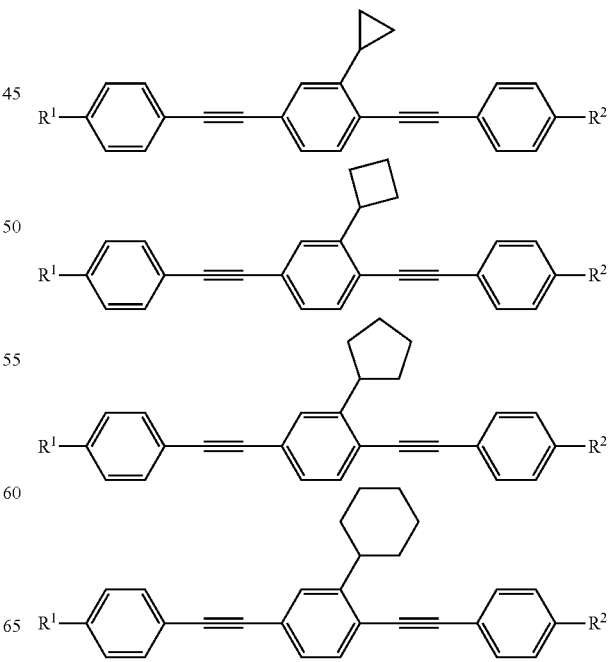

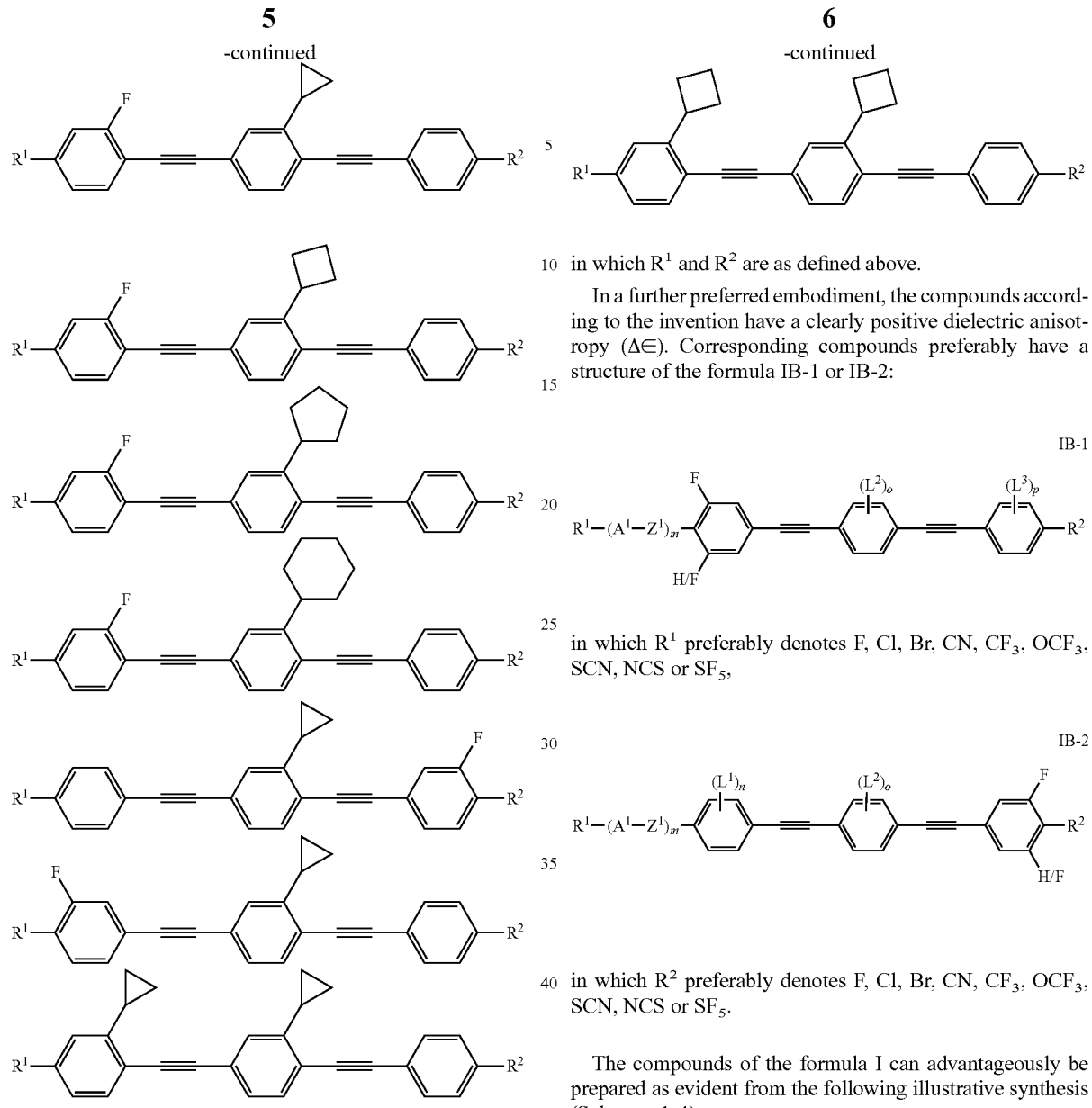

in which $R^1$ and $R^2$ are as defined above.

In a further preferred embodiment, the compounds according to the invention have a clearly positive dielectric anisotropy ($\Delta\epsilon$). Corresponding compounds preferably have a structure of the formula IB-1 or IB-2:

in which $R^1$ preferably denotes F, Cl, Br, CN, $CF_3$, $OCF_3$, SCN, NCS or $SF_5$, in which $R^2$ preferably denotes F, Cl, Br, CN, $CF_3$, $OCF_3$, SCN, NCS or $SF_5$.

The compounds of the formula I can advantageously be prepared as evident from the following illustrative synthesis (Schemes 1-4):

Scheme 1. Illustrative synthesis of the compounds of the formula I (symmetrical); L defined $L^1$, in particular H or F.

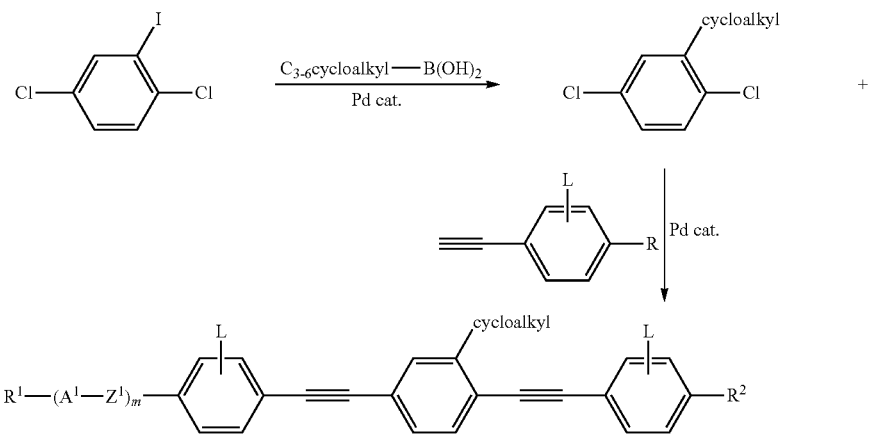

Scheme 2. Illustrative synthesis of the compounds of the formula I (symmetrical); L, defined $L^1$, in particular H or F.
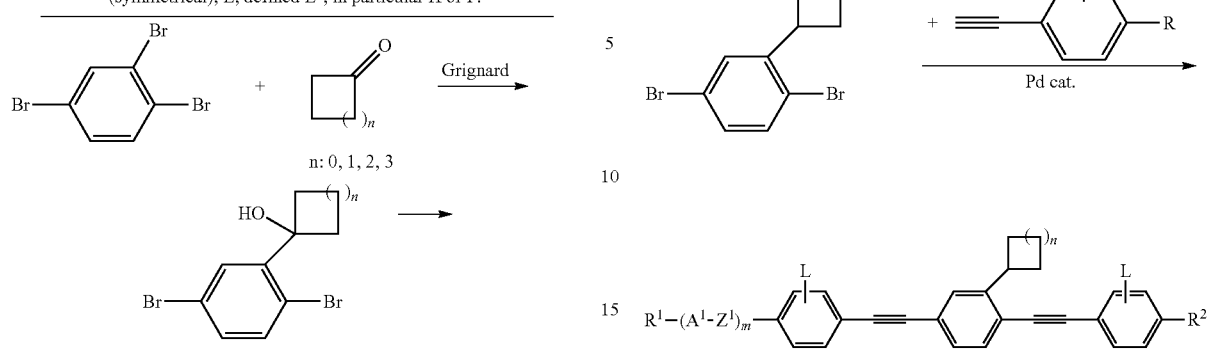
Scheme 3. Illustrative synthesis of the compounds of the formula I (asymmetrical); L, L' defined $L^1$, in particular H or F.
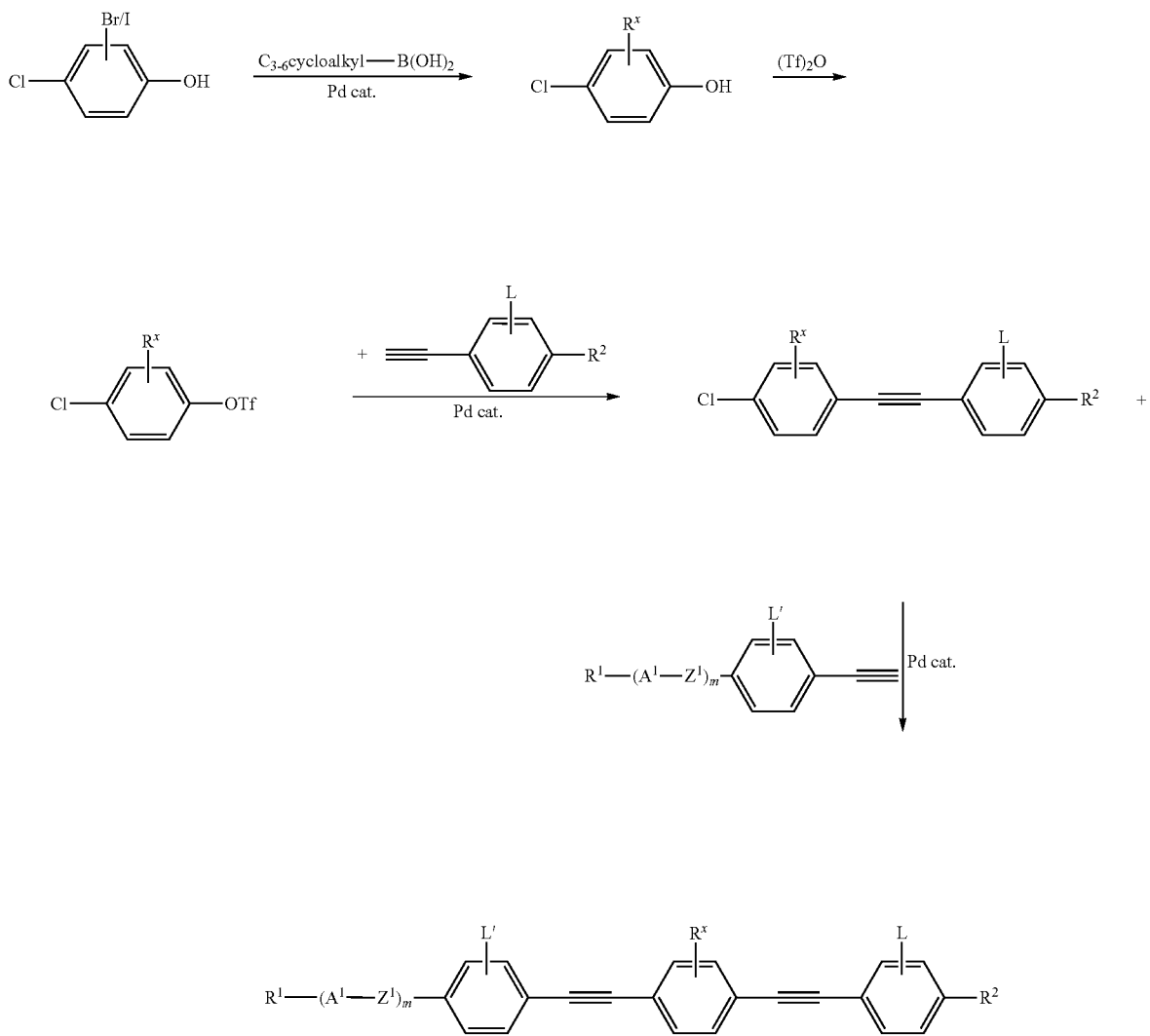

Scheme 4. Illustrative synthesis of the compounds of the formula I (asymmetrical); L, L' defined L¹, in particular H or F.

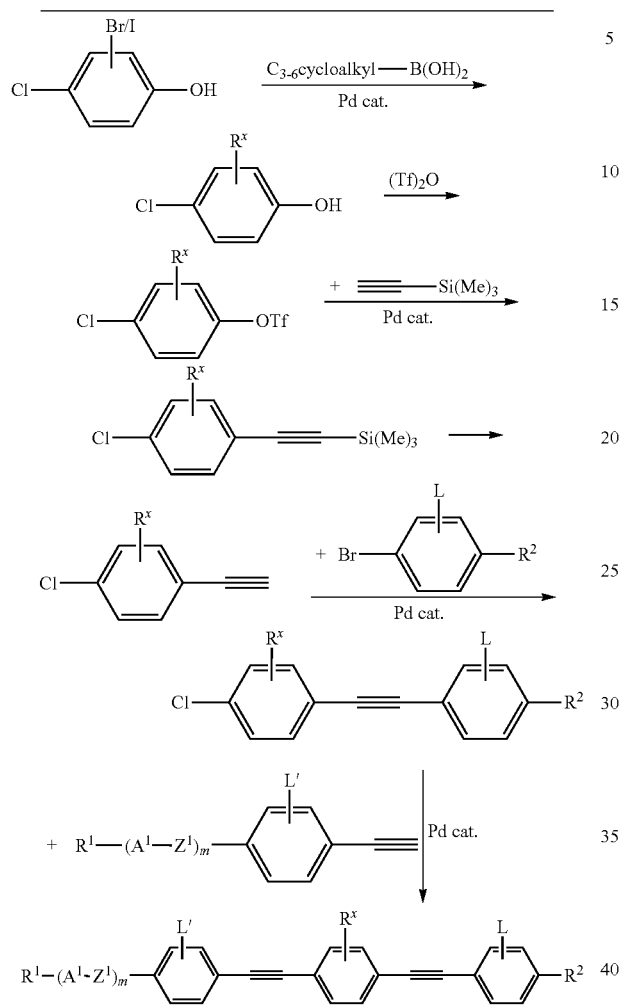

The liquid-crystalline media in accordance with the present invention comprise one or more compounds of the formula I and optionally further, preferably mesogenic components.

Further components are preferably selected from the compounds of the formulae II, III and IV:

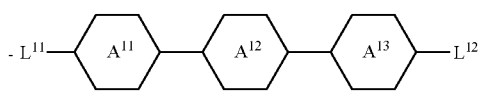

in which
$L^{11}$ denotes $R^{11}$ or $X^{11}$,
$L^{12}$ denotes $R^{12}$ or $X^{12}$,
$R^{11}$ and $R^{12}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
$X^{11}$ and $X^{12}$, independently of one another, denote H, F, Cl, —CN, —NCS, —SF₅, fluorinated alkyl, in particular —CF₃, or fluorinated alkoxy having 1 to 7 C atoms, in particular —OCF₃, or fluorinated alkenyl, fluorinated alkenyloxy or fluorinated alkoxyalkyl having 2 to 7 C atoms, preferably fluorinated alkoxy, fluorinated alkenyloxy, F or Cl, and

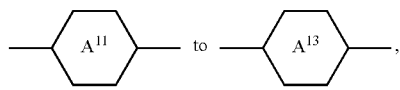

independently of one another, denote

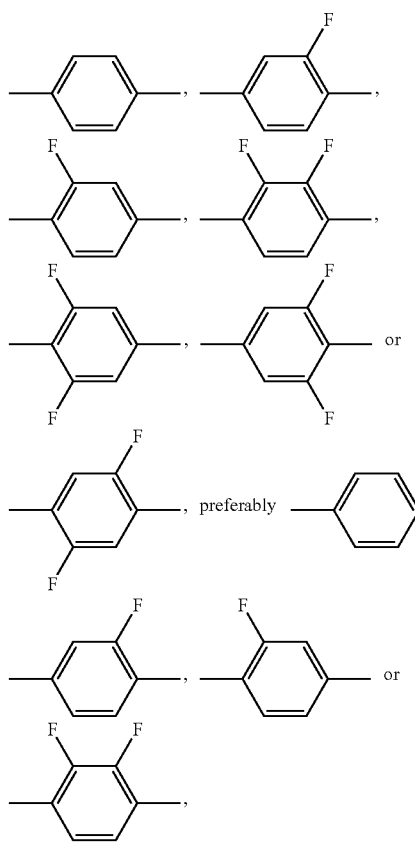

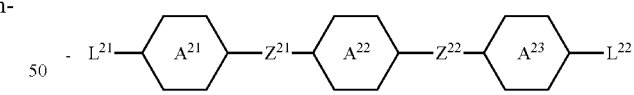

in which
$L^{21}$ denotes $R^{21}$ and, in the case where $Z^{21}$ and/or $Z^{22}$ denote trans-CH=CH— or trans-CF=CF—, alternatively denotes $X^{21}$,
$L^{22}$ denotes $R^{22}$ and, in the case where $Z^{21}$ and/or $Z^{22}$ denote trans-CH=CH— or trans-CF=CF—, alternatively denotes $X^{22}$,
$R^{21}$ and $R^{22}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
$X^{21}$ and $X^{22}$, independently of one another, denote F or Cl, —CN, —NCS, —SF₅, fluorinated alkyl or alkoxy having 1 to 7 C atoms or fluorinated alkenyl, alkenyloxy or alkoxyalkyl having 2 to 7 C atoms, preferably —NCS, one of
$Z^{21}$ and $Z^{22}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and $$-\!\!\left\langle A^{21}\right\rangle\!\!- \text{ to } -\!\!\left\langle A^{23}\right\rangle\!\!-,$$

independently of one another, denote

[structures of fluorinated phenylene rings], preferably [phenylene], [further fluorinated phenylene structures], or [further fluorinated phenylene structure],

IV $$-L^{31}\!\!-\!\!\left\langle A^{31}\right\rangle\!\!-\!Z^{31}\!\!-\!\!\left\langle A^{32}\right\rangle\!\!-\!Z^{32}\!\!-\!\!\left\langle A^{33}\right\rangle\!\!-\!Z^{33}\!\!-\!\!\left\langle A^{34}\right\rangle\!\!-L^{32}$$

in which
$L^{31}$ denotes $R^{31}$ or $X^{31}$,
$L^{32}$ denotes $R^{32}$ or $X^{32}$,
$R^{31}$ and $R^{32}$, independently of one another, denote H, unfluorinated alkyl or unfluorinated alkoxy having 1 to 17, preferably 3 to 10, C atoms, or unfluorinated alkenyl, unfluorinated alkenyloxy or unfluorinated alkoxyalkyl having 2 to 15, preferably 3 to 10, C atoms, preferably alkyl or unfluorinated alkenyl, $X^{31}$ and $X^{32}$, independently of one another, denote H, F, Cl, —CN, —NCS, —SF$_5$, fluorinated alkyl or fluorinated alkoxy having 1 to 7 C atoms or fluorinated alkenyl, fluorinated alkenyloxy or fluorinated alkoxyalkyl having 2 to 7 C atoms, preferably fluorinated alkoxy, fluorinated alkenyloxy, F or Cl, and $Z^{31}$ to $Z^{33}$, independently of one another, denote trans-CH=CH—, trans-CF=CF—, —C≡C— or a single bond, preferably one or more of them denote a single bond, particularly preferably all denote a single bond, and $$-\!\!\left\langle A^{31}\right\rangle\!\!- \text{ to } -\!\!\left\langle A^{34}\right\rangle\!\!-,$$

independently of one another, denote

[structures of fluorinated phenylene rings], preferably [phenylene], [further fluorinated phenylene structures], or [further fluorinated phenylene structure].

In a preferred embodiment of the present invention, the liquid-crystalline media comprise one or more compounds of the formula I and one or more compounds of the formula II.

In a further preferred embodiment of the present invention, the liquid-crystalline media comprise one or more compounds of the formula I and one or more compounds of the formula III.

The liquid-crystalline media in accordance with the present invention likewise preferably comprise one or more compounds of the formula I and one or more compounds of the formula IV.

Particular preference is given in accordance with the present invention to liquid-crystalline media which comprise one or more compounds of the formula I, one or more compounds of the formula II and one or more compounds of the formula III or IV, preferably III.

The liquid-crystalline media in accordance with the present application preferably comprise in total 5 to 90%, preferably 10 to 85% and particularly preferably 15 to 80%, of compounds of the formula I.

The liquid-crystalline media in accordance with the present application preferably comprise in total 15 to 90%, preferably 20 to 85% and particularly preferably 25 to 80%, of compounds of the formula I or II.

The liquid-crystalline media in accordance with the present application preferably comprise in total 1 to 70%, preferably 2 to 65% and particularly preferably 3 to 60%, of compounds of the formula III.

The liquid-crystalline media in accordance with the present application preferably comprise in total 0 to 60%, preferably 5 to 55% and particularly preferably 10 to 50%, of compounds of the formula IV.

The liquid-crystalline media in accordance with the present application likewise preferably comprise in total 5 to 60%, preferably 10 to 50% and particularly preferably 7 to 20%, of compounds of the formula III.

In the case of the use of a single homologous compound, these limits correspond to the concentration of this homologue, which is preferably 2 to 20%, particularly preferably 1 to 15%. In the case of the use of two or more homologues, the concentration of the individual homologues is likewise preferably in each case 1 to 15%.

The compounds of the formulae I to III in each case encompass dielectrically positive compounds having a dielectric anisotropy of greater than 3, dielectrically neutral compounds having a dielectric anisotropy of less than 3 and more than −1.5 and dielectrically negative compounds having a dielectric anisotropy of −1.5 or less.

In a preferred embodiment of the present invention, the liquid-crystal medium comprises, more preferably predominantly consists, even more preferably essentially consists of and very particularly preferably completely consists of one or more compounds of the formula II, preferably selected from the group of the compounds of the formulae II-1 to II-3, preferably of the formulae II-1 and/or II-2, preferably of the formulae II-1 and II-2:

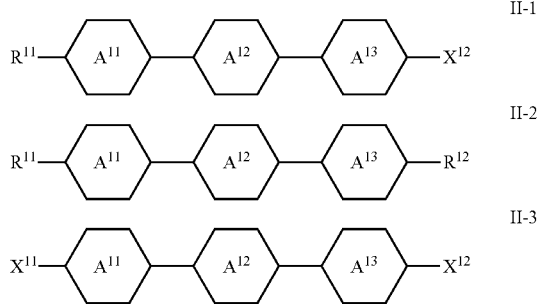

in which the parameters have the respective meanings indicated above for formula II and preferably
$R^{11}$ denotes unfluorinated alkyl having 1 to 7 C atoms or unfluorinated alkenyl having 2 to 7 C atoms,
$R^{12}$ denotes unfluorinated alkyl having 1 to 7 C atoms, unfluorinated alkenyl having 2 to 7 C atoms or unfluorinated alkoxy having 1 to 7 C atoms,
$X^{11}$ and $X^{12}$, independently of one another, denote F, Cl, $-OCF_3$, $-CF_3$, $-CN$, $-NCS$ or $-SF_5$, preferably F, Cl, $-OCF_3$ or $-CN$.

The compounds of the formula II-1 are preferably selected from the group of the compounds of the formulae II-1a to II-1d, more preferably these compounds of the formula II predominantly consist, even more preferably essentially consist and very particularly preferably completely consist thereof:

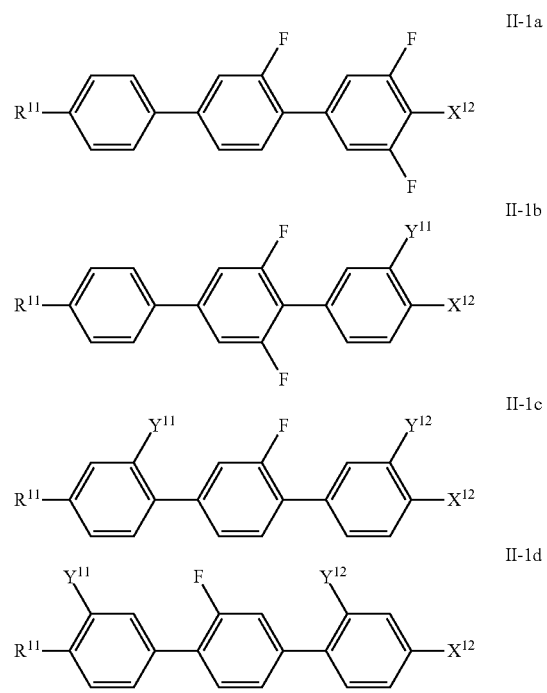

in which the parameters have the respective meanings indicated above for formula II-1 and in which
$Y^{11}$ and $Y^{12}$, in each case independently of one another, denote H or F, and preferably
$R^{11}$ denotes alkyl or alkenyl, and
$X^{11}$ denotes F, Cl or $-OCF_3$.

The compounds of the formula II-2 are preferably selected from the group of the compounds of the formulae II-2a to and/or from the group of the compounds of the formulae II-2f and II-2g, more preferably these compounds of the formula II predominantly consist, even more preferably essentially consist and very particularly preferably completely consist thereof:

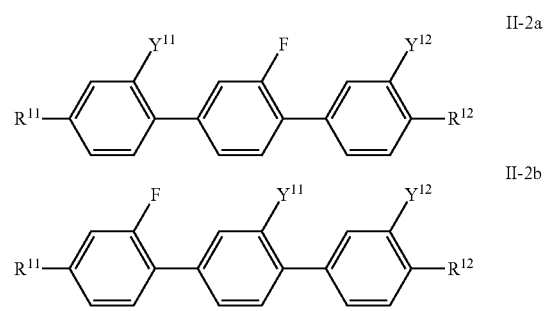

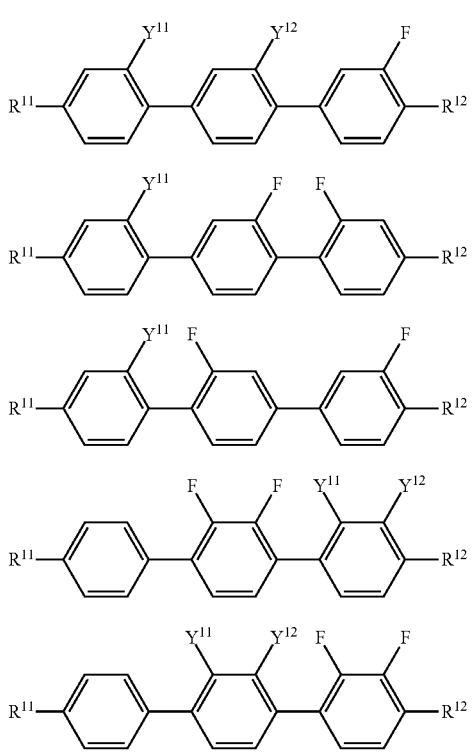

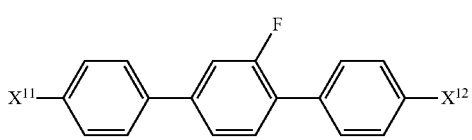

where in each case the compounds of the formula II-2a are excluded from the compounds of the formulae II-2b and II-2c, the compounds of the formula II-2b are excluded from the compounds of the formula II-2c and the compounds of the formula II-2e are excluded from the compounds of the formula II-2f, and
in which the parameters have the respective meanings indicated above for formula II-1 and in which
$Y^{11}$ and $Y^{12}$, in each case independently of one another, denote H or F, and preferably
$R^{11}$ denotes alkyl or alkenyl,
$X^{11}$ denotes F, Cl or —$OCF_3$, and preferably one of $Y^{11}$ and $Y^{12}$ denotes H and the other denotes H or F, preferably likewise denotes H.

The compounds of the formula II-3 are preferably compounds of the formula II-3a:

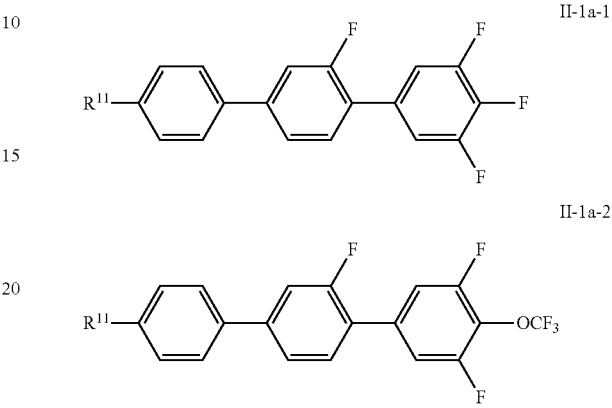

in which the parameters have the respective meanings indicated above for formula II-1 and in which preferably
$X^{11}$ denotes F, Cl, preferably F,
$X^{12}$ denotes F, Cl or —$OCF_3$, preferably —$OCF_3$.

In an even more preferred embodiment of the present invention, the compounds of the formula II are selected from the group of the compounds II-1a to II-1d, preferably selected from the group of the compounds II-1c and II-1d, more preferably these compounds of the formula II predominantly consist, even more preferably essentially consist and very particularly preferably completely consist thereof.

The compounds of the formula II-1a are preferably selected from the group of the compounds of the formulae II-1a-1 and II-1a-2, more preferably these compounds of the formula II predominantly consist, even more preferably essentially consist and very particularly preferably completely consist thereof:

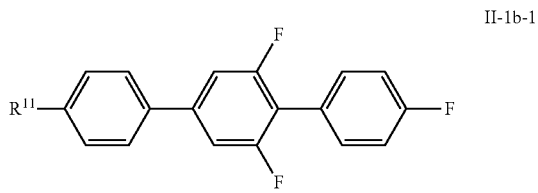

in which
$R^{11}$ has the meaning indicated above and preferably denotes $C_nH_{2n+1}$, in which
n denotes an integer in the range from 0 to 7, preferably in the range from 1 to 5 and particularly preferably 3 or 7.

The compounds of the formula II-1b are preferably compounds of the formula II-1b-1:

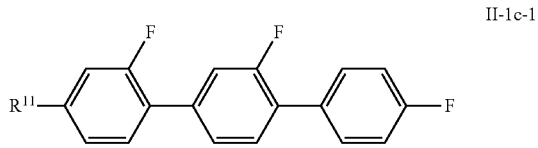

in which
$R^{11}$ has the meaning indicated above and preferably denotes $C_nH_{2n+1}$, in which
n denotes an integer in the range from 0 to 15, preferably in the range from 1 to 7 and particularly preferably 1 to 5.

The compounds of the formula II-1c are preferably selected from the group of the compounds of the formulae II-1c-1 to II-1c-4, preferably selected from the group of the compounds of the formulae II-1c-1 and II-1c-2, more preferably these compounds of the formula II predominantly consist, even more preferably essentially consist and very particularly preferably completely consist thereof:

-continued

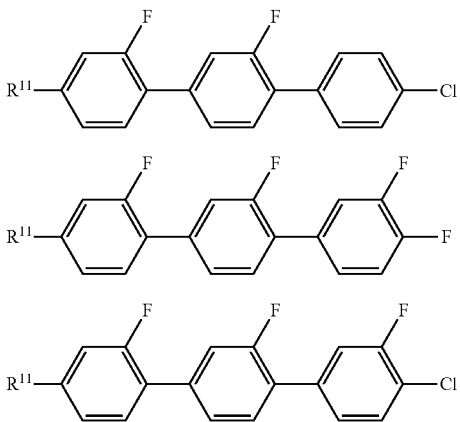

II-1c-2

II-1c-3

II-1c-4 in which
R$^{11}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula II-1d are preferably selected from the group of the compounds of the formulae II-1d-1 and II-1d-2, preferably the compounds of the formula II-1d-2, more preferably these compounds of the formula II predominantly consist, even more preferably essentially consist and very particularly preferably completely consist thereof:

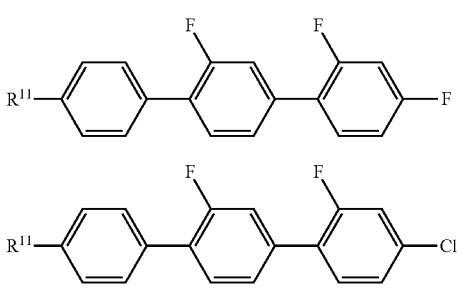

II-1d-1

II-1d-2 in which
R$^{11}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula II-2a are preferably selected from the group of the compounds of the formulae II-2a-1 and II-2a-2, preferably the compounds of the formula II-2a-1, more preferably these compounds of the formula II predominantly consist, even more preferably essentially consist and very particularly preferably completely consist thereof:

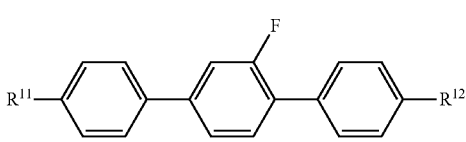

II-2a-1

-continued

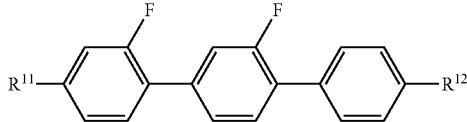

II-2a-2 in which
R$^{11}$ has the meaning indicated above and preferably denotes C$_n$H$_{2n+1}$ or CH$_2$=CH—(CH$_2$)$_z$, and
R$^{12}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

Preferred combinations of (R$^{11}$ and R$^{12}$), in particular in the case of formula II-2a-1, are (C$_n$H$_{2n+1}$ and C$_m$H$_{2m+1}$), (C$_n$H$_{2n+1}$ and O—C$_m$H$_{2m+1}$), (CH$_2$=CH—(CH$_2$)$_z$ and C$_m$H$_{2m+1}$), (CH$_2$=CH—(CH$_2$)$_z$ and O—C$_m$H$_{2m+1}$) and (C$_n$H$_{2n+1}$ and (CH$_2$)$_z$—CH=CH$_2$).

Preferred compounds of the formula II-2b are the compounds of the formula II-2b-1:

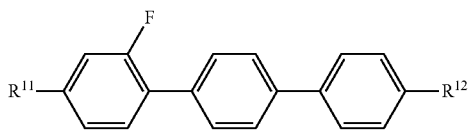

II-2b-1 in which
R$^{11}$ has the meaning indicated above and preferably denotes C$_n$H$_{2n+1}$ or CH$_2$=CH—(CH$_2$)$_z$, and
R$^{12}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{11}$ and R$^{12}$) here is, in particular, (C$_n$H$_{2n+1}$ and C$_m$H$_{2m+1}$).

Preferred compounds of the formula II-2c are the compounds of the formula II-2c-1:

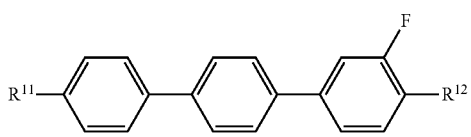

II-2c-1 in which
R$^{11}$ has the meaning indicated above and preferably denotes C$_n$H$_{2n+1}$ or CH$_2$=CH—(CH$_2$)$_z$, and
R$^{12}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula II-2d are the compounds of the formula II-2d-1:

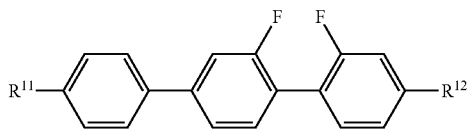

II-2d-1 in which $R^{11}$ has the meaning indicated above and preferably denotes $C_nH_{2n+1}$ or $CH_2$=CH—$(CH_2)_z$, and $R^{12}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of ($R^{11}$ and $R^{12}$) here is, in particular, ($C_nH_{2n+1}$ and $C_mH_{2m+1}$).

Preferred compounds of the formula II-2e are the compounds of the formula II-2e-1:

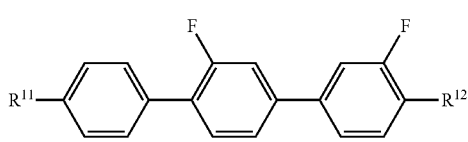

II-2e-1 in which $R^{11}$ has the meaning indicated above and preferably denotes $C_nH_{2n+1}$ or $CH_2$=CH—$(CH_2)_z$, and $R^{12}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of ($R^{11}$ and $R^{12}$) here is, in particular, ($C_nH_{2n+1}$ and O—$C_mH_{2m+1}$).

Preferred compounds of the formula II-2f are the compounds of the formula II-2f-1:

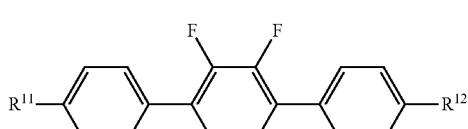

II-2f-1 in which $R^{11}$ has the meaning indicated above and preferably denotes $C_nH_{2n+1}$ or $CH_2$=CH—$(CH_2)_z$, and $R^{12}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{11}$ and $R^{12}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

Preferred compounds of the formula II-2g are the compounds of the formula II-2g-1:

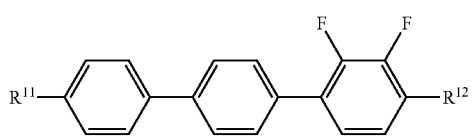

II-2g-1 in which $R^{11}$ has the meaning indicated above and preferably denotes $C_nH_{2n+1}$ or $CH_2$=CH—$(CH_2)_z$, and $R^{12}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{11}$ and $R^{12}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and O—$C_mH_{2m+1}$).

The compounds of the formula III are preferably selected from the group of the compounds of the formulae III-1 to III-4, more preferably these compounds of the formula III predominantly consist, even more preferably essentially consist and very particularly preferably completely consist thereof:

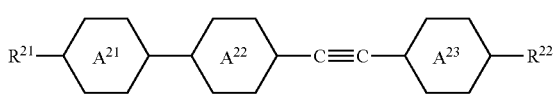

III-1

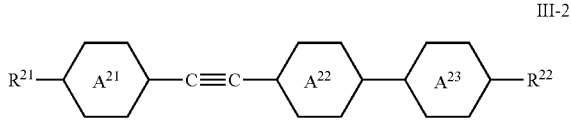

III-2

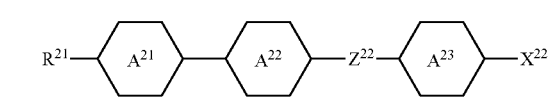

III-3

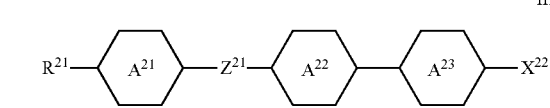

III-4 in which $Z^{21}$ and $Z^{22}$ denote trans-CH=CH— or trans-CF=CF—, preferably trans-CH=CH—, and the other parameters have the meaning given above under formula III and preferably $R^{21}$ and $R^{22}$, independently of one another, denote H, unfluorinated alkyl or alkoxy having 1 to 7 C atoms or unfluorinated alkenyl having 2 to 7 C atoms, $X^{22}$ denotes F, Cl, —CN or —NCS, preferably —NCS, and one of

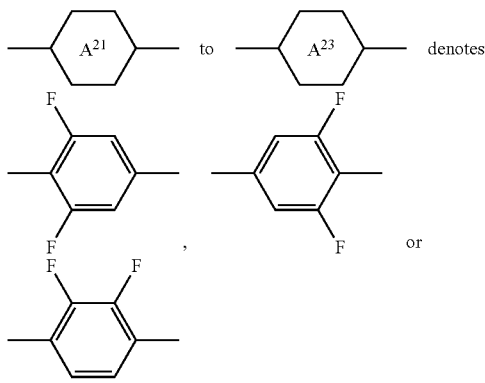

and the others, independently of one another, denote

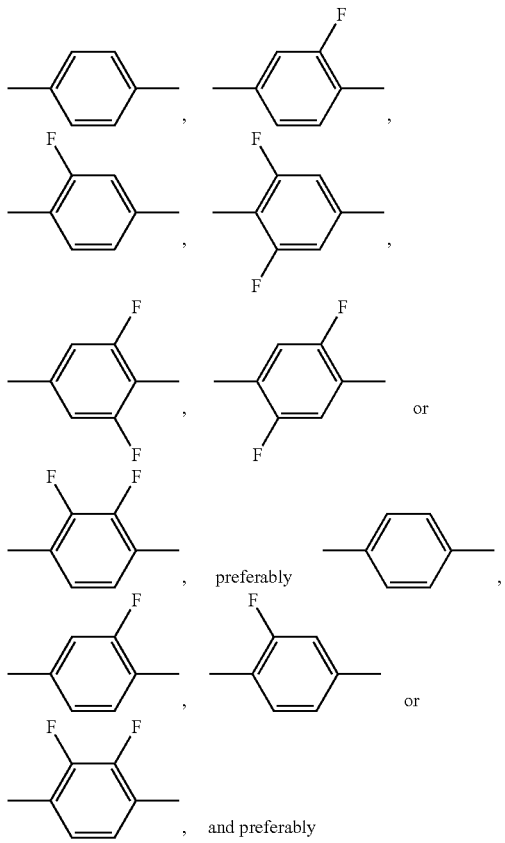

$R^{21}$ denotes $C_nH_{2n+1}$ or $CH_2$=CH—$(CH_2)_z$, and
$R^{22}$ denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The compounds of the formula III-1 are preferably selected from the group of the compounds of the formulae III-1a and III-1b, preferably selected from compounds of the formula III-1a, more preferably these compounds of the formula III predominantly consist, even more preferably essentially consist and very particularly preferably completely consist thereof:

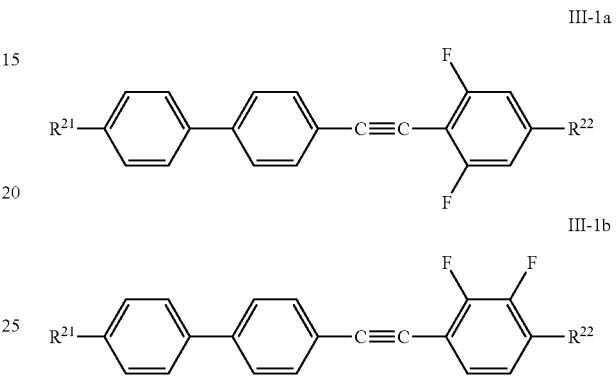

in which $R^{21}$ has the meaning indicated above and preferably denotes $C_nH_{2n+1}$ or $CH_2$=CH—$(CH_2)_z$, and $R^{22}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{21}$ and $R^{22}$) here are, in particular, ($C_nH_{2n+1}$ and $C_mH_{2m+1}$) and ($C_nH_{2n+1}$ and O—$C_mH_{2m+1}$), in the case of formula III-1a particularly preferably ($C_nH_{2n+1}$ and $C_mH_{2m+1}$) and in the case of formula III-1b particularly preferably ($C_nH_{2n+1}$ and O—$C_mH_{2m+1}$).

The compounds of the formula III-2 are preferably compounds of the formula III-2a:

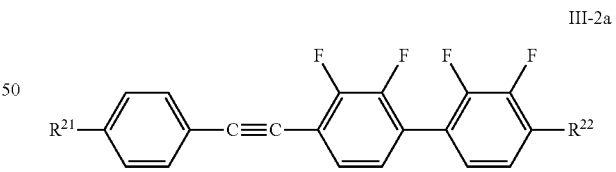

in which $R^{21}$ has the meaning indicated above and preferably denotes $C_nH_{2n+1}$ or $CH_2$=CH—$(CH_2)_z$, and $R^{22}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{21}$ and $R^{22}$) here are, in particular, ($C_nH_{2n+1}$ and $C_mH_{2m+1}$) and ($C_nH_{2n+1}$ and O—$C_mH_{2m+1}$).

The compounds of the formula III-3 are preferably compounds of the formula III-3a or III-3b:

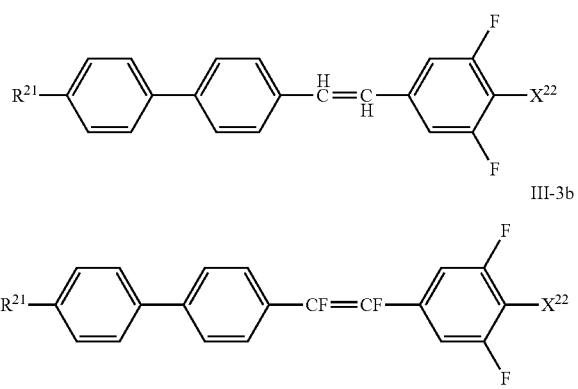

III-3a

III-3b in which the parameters have the meaning given above under formula III-3 and preferably
$R^{21}$ has the meaning indicated above and preferably denotes $C_nH_{2n+1}$, in which
n denotes an integer in the range from 0 to 7, preferably in the range from 1 to 5, and
$X^{22}$ denotes —F, —Cl, —OCF$_3$, —CN or —NCS, particularly preferably —NCS.

The compounds of the formula III-4 are preferably compounds of the formula III-4-a:

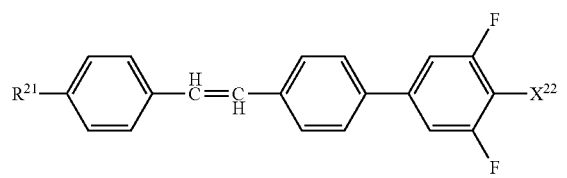

III-4a in which the parameters have the meaning given above under formula III-4 and preferably
$R^{21}$ has the meaning indicated above and preferably denotes $C_nH_{2n+1}$, in which
n denotes an integer in the range from 0 to 7, preferably in the range from 1 to 5, and
$X^{22}$ denotes —F, —Cl, —OCF$_3$, —CN or —NCS, particularly preferably —NCS.

Further preferred compounds of the formula III are the compounds of the following formulae:

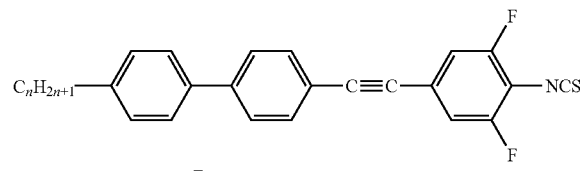

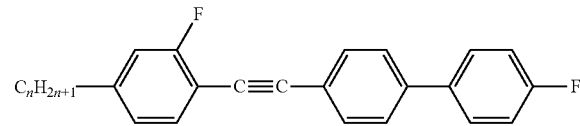

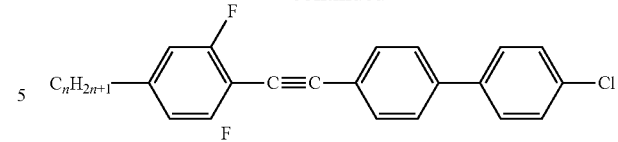

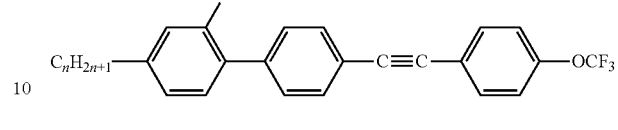

in which
n denotes an integer in the range from 0 to 7, preferably in the range from 1 to 5.

The compounds of the formula IV are preferably selected from the group of the compounds of the formulae IV-1 to IV-6, more preferably these compounds of the formula IV predominantly consist, even more preferably essentially consist and very particularly preferably completely consist thereof:

IV-1

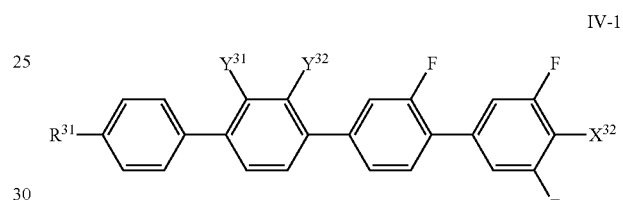

IV-2

IV-3

IV-4

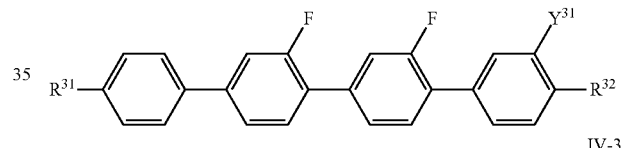

IV-5

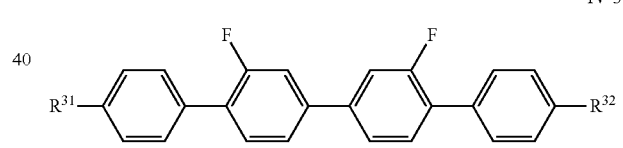

IV-6

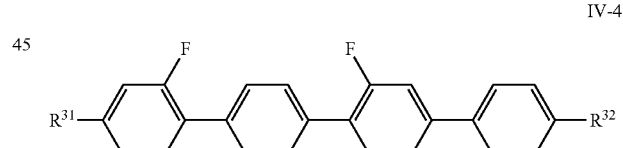

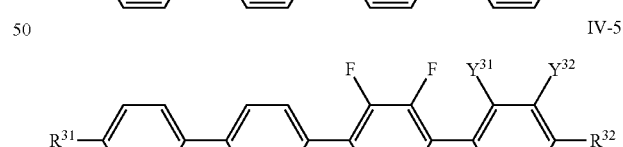

where the compounds of the formula IV-5 are excluded from the compounds of the formula IV-6, and
in which the parameters have the respective meanings indicated above for formula IV and preferably $R^{31}$ denotes unfluorinated alkyl or alkoxy, each having 1 to 7 C atoms, or unfluorinated alkenyl having 2 to 7 C atoms, $R^{32}$ denotes unfluorinated alkyl or alkoxy, each having 1 to 7 C atoms, or unfluorinated alkenyl having 2 to 7 C atoms, and $X^{32}$ denotes —F, —Cl or —OCF$_3$, preferably —F, and particularly preferably $R^{31}$ has the meaning indicated above and preferably denotes $C_nH_{2n+1}$ or $CH_2=CH—(CH_2)_z$, and $R^{32}$ has the meaning indicated above and preferably denotes $C_mH_{2m+1}$ or $O—C_mH_{2m+1}$ or $(CH_2)_z—CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The compounds of the formula IV-1 are preferably selected from the group of the compounds of the formulae IV-1a to IV-1d, more preferably these compounds of the formula IV-1 predominantly consist, even more preferably essentially consist and very particularly preferably completely consist thereof:

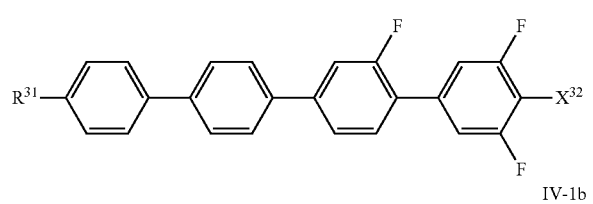

IV-1a

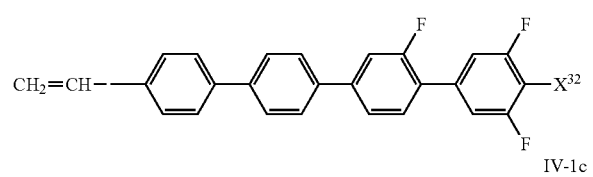

IV-1b

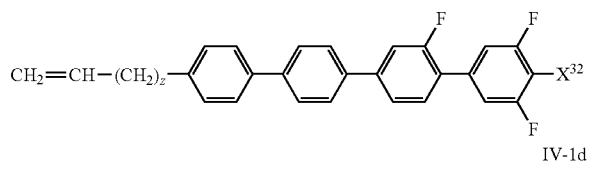

IV-1c

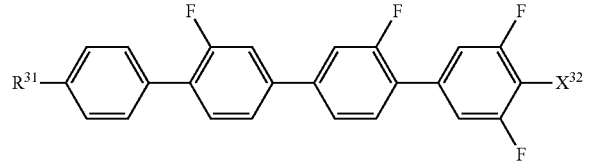

IV-1d in which $X^{32}$ has the meaning given above for formula IV-1 and $R^{31}$ has the meaning indicated above and preferably denotes $C_nH_{2n+1}$, in which n denotes 1 to 7, preferably 2 to 6, particularly preferably 2, 3 or 5, and z denotes 0, 1, 2, 3 or 4, preferably 0 or 2, and $X^{32}$ preferably denotes F.

The compounds of the formula IV-2 are preferably selected from the group of the compounds of the formulae IV-2a and IV-2b, preferably of the formula IV-2a, more preferably these compounds of the formula IV-2 predominantly consist, even more preferably essentially consist and very particularly preferably completely consist thereof:

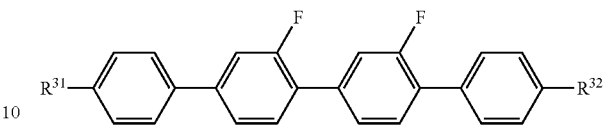

IV-2a

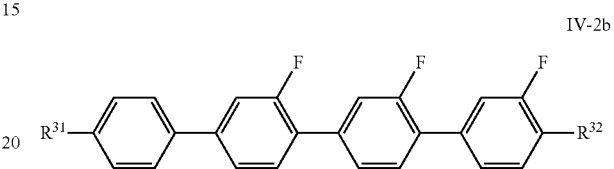

IV-2b in which $R^{31}$ has the meaning indicated above and preferably denotes $C_nH_{2n+1}$ or $CH_2=CH—(CH_2)_z$, and $R^{32}$ has the meaning indicated above and preferably denotes $C_mH_{2m+1}$ or $O—C_mH_{2m+1}$ or $(CH_2)_z—CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O—C_mH_{2m+1}$), particularly preferably ($C_nH_{2n+1}$ and $C_mH_{2m+1}$).

The compounds of the formula IV-3 are preferably compounds of the formula IV-3a:

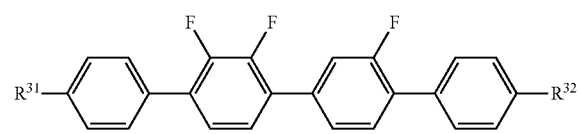

IV-3a in which $R^{31}$ has the meaning indicated above and preferably denotes $C_nH_{2n+1}$ or $CH_2=CH—(CH_2)_z$, and $R^{32}$ has the meaning indicated above and preferably denotes $C_mH_{2m+1}$ or $O—C_mH_{2m+1}$ or $(CH_2)_z—CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O—C_mH_{2m+1}$), particularly preferably ($C_nH_{2n+1}$ and $C_mH_{2m+1}$).

The compounds of the formula IV-4 are preferably compounds of the formula IV-4-a:

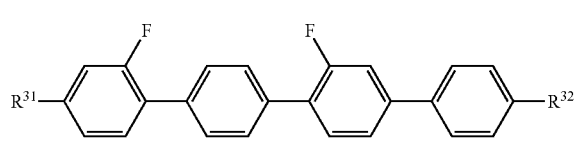

IV-4a in which
R$^{31}$ has the meaning indicated above and preferably denotes C$_n$H$_{2n+1}$ or CH$_2$=CH—(CH$_2$)$_z$, and
R$^{32}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula IV-5 are preferably selected from the group of the compounds of the formulae IV-5a and IV-5b, preferably of the formula IV-5a, more preferably these compounds of the formula IV-5 predominantly consist, even more preferably essentially consist and very particularly preferably completely consist thereof:

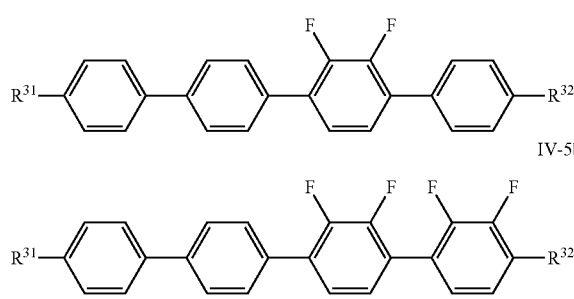

in which
R$^{31}$ has the meaning indicated above and preferably denotes C$_n$H$_{2n+1}$ or CH$_2$=CH—(CH$_2$)$_z$, and
R$^{32}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The compounds of the formula IV-6 are preferably selected from the group of the compounds of the formulae IV-6a and IV-6b, more preferably these compounds of the formula IV-6 predominantly consist, even more preferably essentially consist and very particularly preferably completely consist thereof:

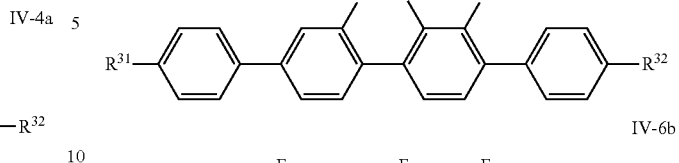

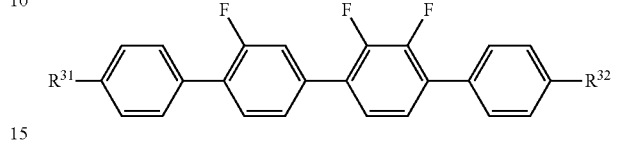

in which
R$^{31}$ has the meaning indicated above and preferably denotes C$_n$H$_{2n+1}$ or CH$_2$=CH—(CH$_2$)$_z$, and
R$^{32}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{31}$ and R$^{32}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

The media in accordance with the present invention optionally comprise one or more compounds of the formula V

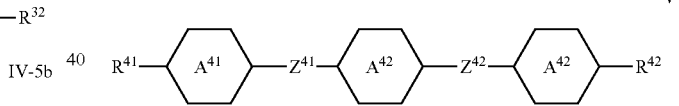

in which
R$^{41}$ and R$^{42}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl,
one of
Z$^{41}$ and Z$^{42}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

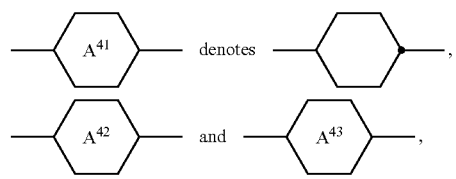

independently of one another, denote

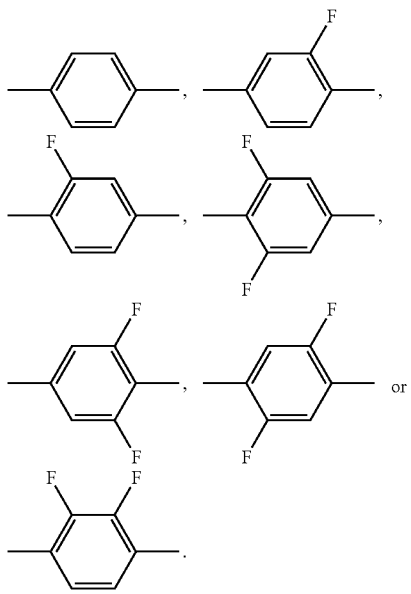

The liquid-crystalline media in accordance with the present application preferably comprise in total 0 to 40%, preferably 0 to 30% and particularly preferably 5 to 25%, of compounds of the formula V.

The compounds of the formula V are preferably selected from the group of the compounds of the formulae V-1 to V-3, more preferably these compounds of the formula V predominantly consist, even more preferably essentially consist and very particularly preferably completely consist thereof:

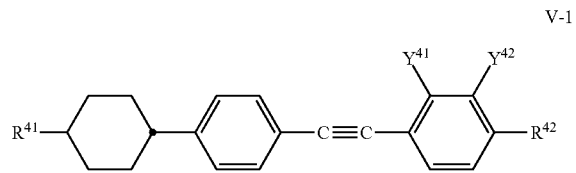

V-1

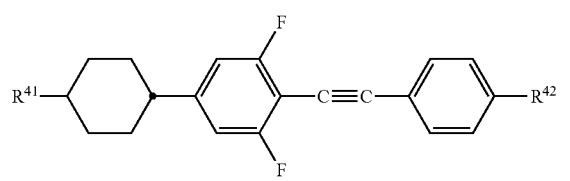

V-2

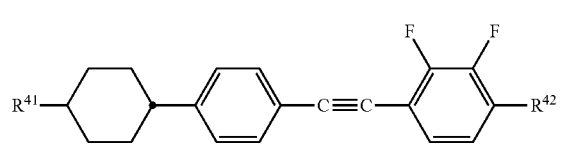

V-3 in which
one of
$Y^{41}$ and $Y^{42}$ denotes H and the other denotes H or F, and
$R^{41}$ has the meaning indicated above and preferably denotes $C_nH_{2n+1}$ or $CH_2=CH-(CH_2)_z$, and
$R^{42}$ has the meaning indicated above and preferably denotes $C_mH_{2m+1}$ or $O-C_mH_{2m+1}$ or $(CH_2)_z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula V-1 are preferably selected from the group of the compounds of the formulae V-1a to V-1c, more preferably these compounds of the formula V-1 predominantly consist, even more preferably essentially consist and very particularly preferably completely consist thereof:

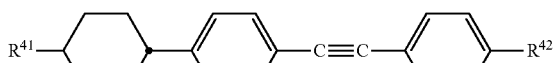

V-1a

V-1b

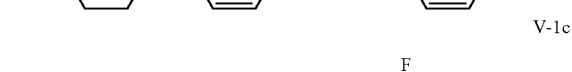

V-1c in which
$R^{41}$ has the meaning indicated above and preferably denotes $C_nH_{2n+1}$ or $CH_2=CH-(CH_2)_z$, and
$R^{42}$ has the meaning indicated above and preferably denotes $C_mH_{2m+1}$ or $O-C_mH_{2m+1}$ or $(CH_2)_z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula V-2 are preferably compounds of the formula V-2a:

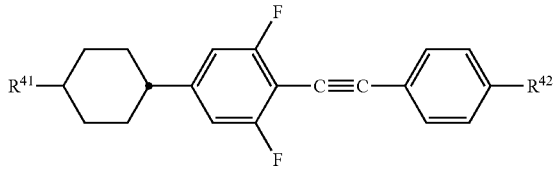

V-2a in which
$R^{41}$ has the meaning indicated above and preferably denotes
  $C_nH_{2n+1}$ or $CH_2$=CH—$(CH_2)_z$, and
$R^{42}$ has the meaning indicated above and preferably denotes
  $C_mH_{2m+1}$ or O—$C_mH_{2m+1}$ or $(CH_2)_z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$), ($C_nH_{2n+1}$ and O—$C_mH_{2m+1}$) and ($CH_2$=CH—$(CH_2)_z$ and $C_mH_{2m+1}$), particularly preferably ($C_nH_{2n+1}$ and $C_mH_{2m+1}$).

The compounds of the formula V-3 are preferably compounds of the formula V-3a:

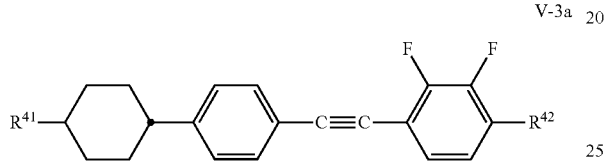

V-3a in which
$R^{41}$ has the meaning indicated above and preferably denotes
  $C_nH_{2n+1}$ or $CH_2$=CH—$(CH_2)_z$, and
$R^{42}$ has the meaning indicated above and preferably denotes
  $C_mH_{2m+1}$ or O—$C_mH_{2m+1}$ or $(CH_2)_z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{41}$ and $R^{42}$) here are, in particular, ($C_nH_{2n+1}$ and $C_mH_{2m+1}$) and ($C_nH_{2n+1}$ and O—$C_mH_{2m+1}$).

The media in accordance with the present invention optionally comprise one or more compounds of the formula VI

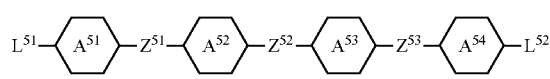

VI in which
$L^{51}$ denotes $R^{51}$ or $X^{51}$,
$L^{52}$ denotes $R^{52}$ or $X^{52}$,
$R^{51}$ and $R^{52}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl,
$X^{51}$ and $X^{52}$, independently of one another, denote H, F, Cl, —CN, —NCS, —$SF_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and
$Z^{51}$ to $Z^{53}$, independently of one another, denote trans-CH=CH—, trans-CF=CF—, —C≡C— or a single bond, preferably one or more of them denote a single bond, and particularly preferably all denote a single bond,

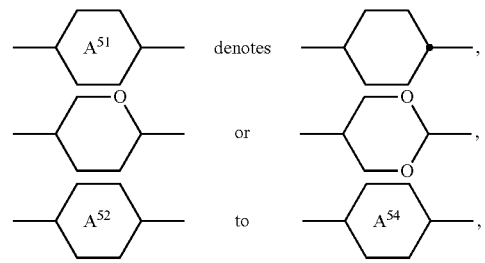

independently of one another, denote

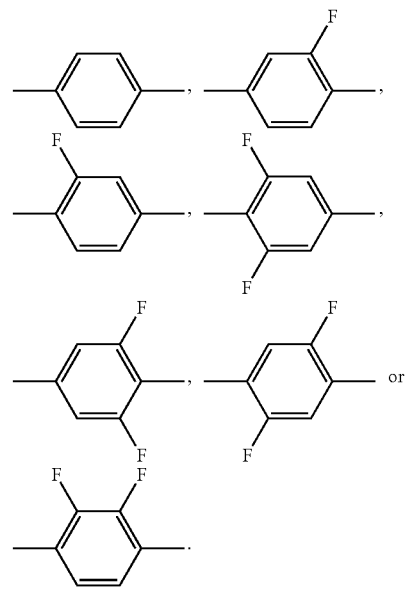

The compounds of the formula VI are preferably selected from the group of the compounds of the formulae VI-1 to VI-3, more preferably these compounds of the formula VI predominantly consist, even more preferably essentially consist and very particularly preferably completely consist thereof:

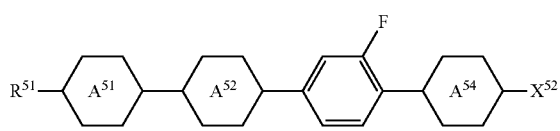

VI-1

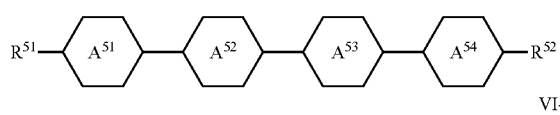

VI-2

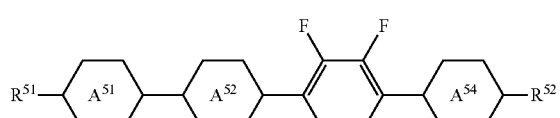

VI-3 in which the parameters have the respective meaning indicated above under formula VI and preferably one of

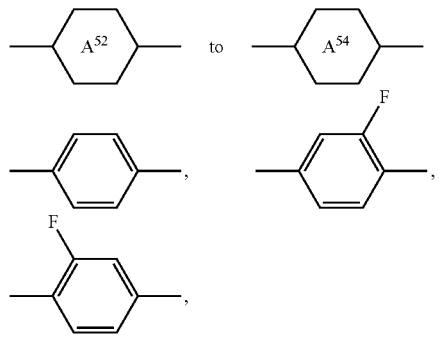 to 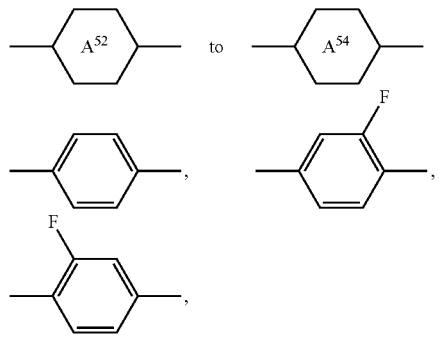 denotes and
in which
R$^{51}$ has the meaning indicated above and preferably denotes C$_n$H$_{2n+1}$ or CH$_2$=CH—(CH$_2$)$_z$, and
R$^{52}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{51}$ and R$^{52}$) here are, in particular, (C$_n$H$_{2n+1}$ and C$_m$H$_{2m+1}$) and (C$_n$H$_{2n+1}$ and O—C$_m$H$_{2m+1}$).

The liquid-crystalline media in accordance with the present application preferably comprise in total 5 to 30%, preferably 10 to 25% and particularly preferably 15 to 20%, of compounds of the formula VI.

The compounds of the formula VI-1 are preferably selected from the group of the compounds of the formulae VI-1a to VI-1e, more preferably these compounds of the formula VI-1 predominantly consist, even more preferably essentially consist and very particularly preferably completely consist thereof:

VI-1a

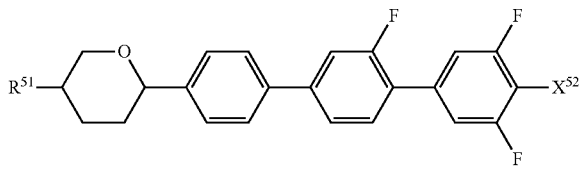

VI-1b

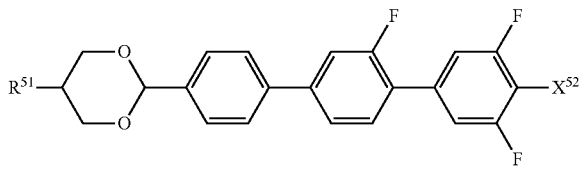

VI-1c

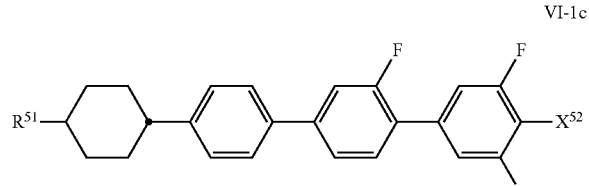

VI-1d

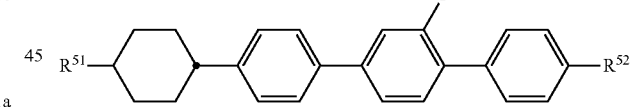

VI-1e

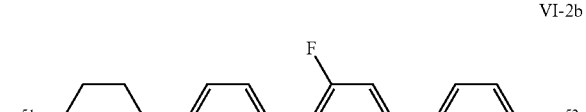

in which the parameters have the meaning given above and preferably
R$^{51}$ has the meaning indicated above and preferably denotes C$_n$H$_{2n+1}$, and
n denotes an integer in the range from 0 to 15, preferably in the range from 1 to 7 and particularly preferably 1 to 5, and
X$^{52}$ preferably denotes F or Cl.

The compounds of the formula VI-2 are preferably selected from the group of the compounds of the formulae VI-2a and VI-2b, more preferably these compounds of the formula VI-2 predominantly consist, even more preferably essentially consist and very particularly preferably completely consist thereof:

VI-2a

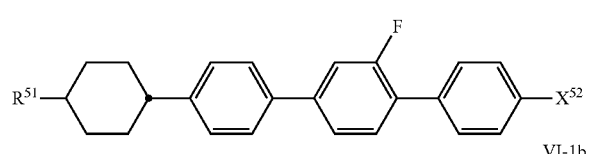

VI-2b

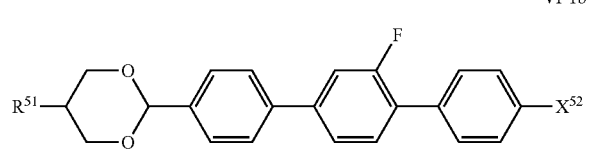

in which
R$^{51}$ has the meaning indicated above and preferably denotes C$_n$H$_{2n+1}$ or CH$_2$=CH—(CH$_2$)$_z$, and has the meaning indicated above and preferably
R$^{52}$ denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of ($R^{51}$ and $R^{52}$) here is, in particular, ($C_nH_{2n+1}$ and $C_mH_{2m+1}$).

The compounds of the formula VI-3 are preferably compounds of the formula VI-3a or VI-3b:

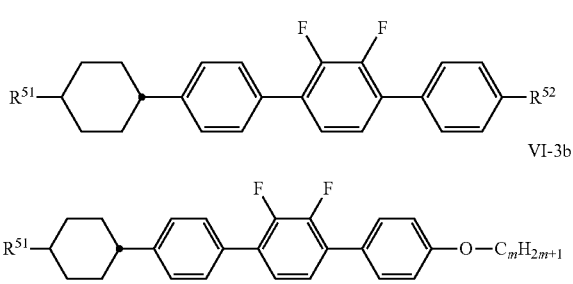

VI-3a

VI-3b in which $R^{51}$ has the meaning indicated above and preferably denotes $C_nH_{2n+1}$ or $CH_2=CH-(CH_2)_z$, and $R^{52}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $O-C_mH_{2m+1}$).

In a preferred embodiment of the present invention, the medium comprises one or more dielectrically positive compounds of the formula II-1 having a dielectric anisotropy of greater than 3.

The medium preferably comprises one or more dielectrically neutral compounds of the formula II-2 having a dielectric anisotropy in the range from greater than −1.5 to 3.

In a preferred embodiment of the present invention, the medium comprises one or more compounds of the formula III.

In a further preferred embodiment of the present invention, the medium comprises one or more compounds of the formula IV.

The liquid-crystalline media in accordance with the present invention preferably comprise 10% or less, preferably 5% or less, particularly preferably 2% or less, very particularly preferably 1% or less, and in particular absolutely no compound having only two or fewer five- and/or six-membered rings.

The definitions of the abbreviations (acronyms) are likewise indicated below in Table D or are evident from Tables A to C.

The liquid-crystalline media in accordance with the present invention preferably comprise, more preferably predominantly consist of, even more preferably essentially consist of and very particularly preferably completely consist of compounds selected from the group of the compounds of the formulae I to VI, preferably I to V.

In this application, comprise in connection with compositions means that the entity in question, i.e. the medium or the component, comprises the component or components or compound or compounds indicated, preferably in a total concentration of 10% or more and very preferably 20% or more.

In this connection, predominantly consist of means that the entity in question comprises 55% or more, preferably 60% or more and very preferably 70% or more, of the component or components or compound or compounds indicated.

In this connection, essentially consist of means that the entity in question comprises 80% or more, preferably 90% or more and very preferably 95% or more, of the component or components or compound or compounds indicated.

In this connection, completely consist of means that the entity in question comprises 98% or more, preferably 99% or more and very preferably 100.0%, of the component or components or compound or compounds indicated.

Other mesogenic compounds which are not explicitly mentioned above can optionally and advantageously also be used in the media in accordance with the present invention. Such compounds are known to the person skilled in the art.

In accordance with the present invention, the compounds of the formula I are preferably used in a total concentration of 10% to 90%, more preferably 15% to 60%, even more preferably 30% to 50% and very preferably 25% to 45%, of the mixture as a whole.

In accordance with the present invention, the compounds of the formula II are preferably used in a total concentration of 10% to 70%, more preferably 15% to 60%, even more preferably 30% to 50% and very preferably 25% to 45%, of the mixture as a whole.

The compounds of the formula III are preferably used in a total concentration of 1% to 20%, more preferably 1% to 15%, even more preferably 2% to 15% and very preferably 3% to 10%, of the mixture as a whole.

The compounds of the formula IV are preferably used in a total concentration of 1% to 60%, more preferably 5% to 50%, even more preferably 10% to 45% and very preferably 15% to 40%, of the mixture as a whole.

The liquid-crystal media preferably comprise, more preferably predominantly consist of and very preferably completely consist of in total 50% to 100%, more preferably 70% to 100% and very preferably 80% to 100% and in particular 90% to 100%, of the compounds of the formulae I, III, IV, V and VI, preferably of the formulae I, III and VI.

In the present application, the expression dielectrically positive describes compounds or components where $\Delta\varepsilon > 3.0$, dielectrically neutral describes those where $-1.5 \le \Delta\varepsilon \le 3.0$ and dielectrically negative describes those where $\Delta\varepsilon < -1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\| - \varepsilon_\perp)$, whereas $\varepsilon_{average}$ is $(\varepsilon_\| + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\epsilon$) is determined at a frequency of 1 kHz. The threshold voltages, as well as all other electro-optical properties, are determined using test cells produced at Merck KGaA, Germany. The test cells for the determination of $\Delta\epsilon$ have a cell thickness of approximately 20 μm. The electrode is a circular ITO electrode having an area of 1.13 cm² and a guard ring. The orientation layers are SE-1211 from Nissan Chemicals, Japan, for homeotropic orientation ($\epsilon_\parallel$) and polyimide AL-1054 from Japan Synthetic Rubber, Japan, for homogeneous orientation ($\epsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages are determined under perpendicular observation. The threshold ($V_{10}$), mid-grey ($V_{50}$) and saturation ($V_{90}$) voltages are determined for 10%, 50% and 90% relative contrast, respectively.

The liquid-crystalline media are investigated with respect to their properties in the microwave frequency range as described in A. Penirschke, S. Müller, P. Scheele, C. Weil, M. Wittek, C. Hock and R. Jakoby: "Cavity Perturbation Method for Characterisation of Liquid Crystals up to 35 GHz", 34$^{th}$ European Microwave Conference—Amsterdam, pp. 545-548.

Compare in this respect also A. Gaebler, F. Gölden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) capillary. The capillary has an internal radius of 180 μm and an external radius of 350 μm. The effective length is 2.0 cm. The filled capillary is introduced into the centre of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterisation of Liquid Crystals up to 35 GHz", 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnet is set correspondingly and then rotated correspondingly through 90°.

The dielectric anisotropy in the microwave range is defined as $$\Delta\epsilon_r \equiv (\epsilon_{r,\parallel} - \epsilon_{r,\perp}).$$

The modulatability or tuneability (τ) is defined as $$\tau \equiv (\Delta\epsilon_r / \epsilon_{r,\parallel}).$$

The material quality (η) is defined as $$\eta \equiv (\tau / \tan\delta_{\epsilon r,max}),$$

with the maximum dielectric loss factor $\tan\delta_{\epsilon r,max}$:

$$\tan\delta_{\epsilon r,max} \equiv \max.\{\tan\delta_{\epsilon r,\perp}; \tan\delta_{\epsilon r,\parallel}\},$$

which arises from the maximum value of the measured values for $\tan\delta_{\epsilon r}$.

The material quality (η) of the preferred liquid-crystal materials is 5 or more, preferably 6 or more, preferably 8 or more, preferably 10 or more, preferably 15 or more, preferably 17 or more, particularly preferably 20 or more and very particularly preferably 25 or more.

In the corresponding components, the preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

In the present application, the term compounds is taken to mean both one compound and a plurality of compounds, unless expressly stated otherwise.

The liquid-crystal media according to the invention preferably have nematic phases of in each case at least from −20° C. to 80° C., preferably from −30° C. to 85° C. and very particularly preferably from −40° C. to 100° C. The phase particularly preferably extends to 120° C. or more, preferably to 140° C. or more and very particularly preferably to 180° C. or more. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a cell thickness of 5 μm for at least 100 hours. At high temperatures, the clearing point is measured in capillaries by conventional methods.

The liquid-crystal media in accordance with the present invention preferably have a clearing point of 90° C. or more, more preferably 100° C. or more, even more preferably 120° C. or more, particularly preferably 150° C. or more and very particularly preferably 170° C. or more.

The $\Delta\varepsilon$ of the liquid-crystal medium in accordance with the invention, at 1 kHz and 20° C., is preferably 1 or more, more preferably 2 or more and very preferably 3 or more.

The $\Delta n$ of the liquid-crystal media in accordance with the present invention, at 589 nm ($Na^D$) and 20° C., is preferably in the range from 0.200 or more to 0.90 or less, more preferably in the range from 0.250 or more to 0.90 or less, even more preferably in the range from 0.300 or more to 0.85 or less and very particularly preferably in the range from 0.350 or more to 0.800 or less.

In a preferred embodiment of the present application, the $\Delta n$ of the liquid-crystal media in accordance with the present invention is preferably 0.50 or more, more preferably 0.55 or more.

Furthermore, the liquid-crystal media according to the invention are characterised by high anisotropies in the microwave range. The birefringence is, for example, preferably 0.14 or more, particularly preferably 0.15 or more, particularly preferably 0.20 or more, particularly preferably 0.25 or more and very particularly preferably 0.30 or more, at about 8.3 GHz. In addition, the birefringence is preferably 0.80 or less.

In some embodiments, however, liquid crystals having a negative value of the dielectric anisotropy can also advantageously be used.

The liquid crystals employed are either individual substances or mixtures. They preferably have a nematic phase.

Preferred components which comprise a liquid-crystal medium or at least one compound in accordance with the invention are phase shifters, varactors, antenna arrays (for example for radio, mobile communications, microwave/radar and other data transmission), 'matching circuit adaptive filters' and others. Preference is given to components for high-frequency technology, as defined above. Very particularly preferred components are phase shifters. In preferred embodiments, a plurality of phase shifters are functionally connected, giving, for example, a phase-controlled group antenna. A group antenna uses the phase shift of the transmitting or receiving elements arranged in a matrix in order to achieve bundling through interference. A parallel arrangement of phase shifters in row or grid form enables the construction of a so-called 'phased array', which can serve as tuneable transmitting or receiving antenna for high frequencies (for example gigahertz range). Phased array antennae according to the invention have a very broad usable reception cone.

Preferred applications are radar installations and data transmission equipment on manned or unmanned vehicles from the automobile, shipping, aircraft, space travel and satellite technology areas.

For the production of suitable components, in particular phase shifters, a liquid-crystalline medium according to the invention is typically introduced into rectangular cavities having a cross section of less than 1 mm and a length of several centimetres. The cavities have opposing electrodes mounted along two long sides. Such arrangements are familiar to the person skilled in the art. Through application of a variable voltage, the dielectric properties of the liquid-crystalline medium can be tuned in later operation in order to set different frequencies or directions of an antenna.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

Compounds containing a vinyl end group and compounds containing a methyl end group have low rotational viscosity.

In the present application, high-frequency technology denotes applications having frequencies in the range from 1 MHz to 1 THz, preferably from 1 GHz to 500 GHz, more preferably 2 GHz to 300 GHz, particularly preferably from about 5 to 150 GHz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

The liquid-crystal media according to the invention consist of a plurality of compounds, preferably 3 to 30, more preferably 4 to 20 and very preferably 4 to 16, compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present application, high-frequency technology means applications having frequencies in the range from 1 MHz to 1 THz, preferably from 1 GHz to 500 GHz, preferably 2 GHz to 300 GHz, particularly preferably from about 5 to 150 GHz. The application is preferably in the microwave spectrum or adjacent regions suitable for communications transfer in which 'phased array' modules can be used in transmitting and receiving antennae.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, having n, m and l C atoms respectively, where n, m and l denote 1 to 15. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

| Ring elements | |
|---|---|
| (cyclohexane) | C |
| (1,3-dioxane) | D |
| (1,3-dioxane) | Dl |
| (tetrahydropyran) | A |
| (tetrahydropyran) | Al |
| (phenyl) | P |
| (fluorophenyl) | G |
| (fluorophenyl) | Gl |
| (difluorophenyl) | U |

TABLE A-continued

| Ring elements | |
|---|---|
| (difluorophenyl) | Ul |
| (difluorophenyl) | Y |
| (pyrimidine) | M |
| (pyrimidine) | Ml |
| (pyridine) | N |
| (pyridine) | Nl |
| (naphthalene) | Np |
| (trifluoronaphthalene) | N3f |
| (trifluoronaphthalene) | N3fl |
| (tetrahydronaphthalene) | tH |
| (tetrahydronaphthalene) | tHl |

TABLE A-continued

Ring elements

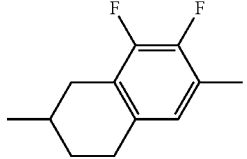 tH2f

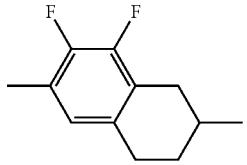 tH2fl

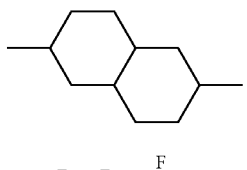 dH

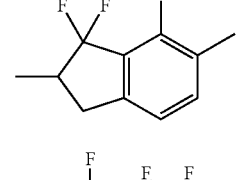 K

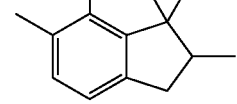 Kl

 L

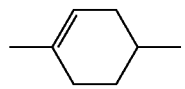 Ll

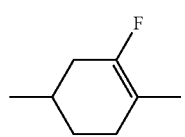 F

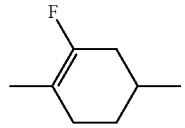 Fl

TABLE B

| Linking groups | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | T | —C≡C— |

TABLE C

| End groups | | | |
|---|---|---|---|
| Left-hand side | | Right-hand side | |
| Use alone | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Use together with others | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots " . . . " are placeholders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

The illustrative structures are compounds which are particularly preferably employed.
Having three 6-membered rings

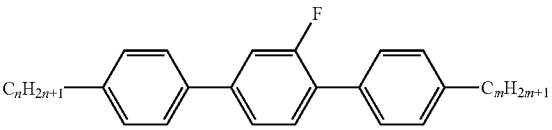
PGP-n-m

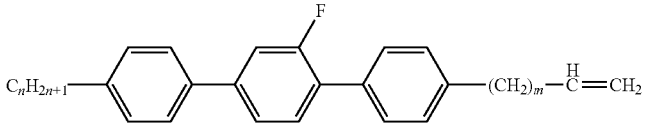
PGP-n-mV

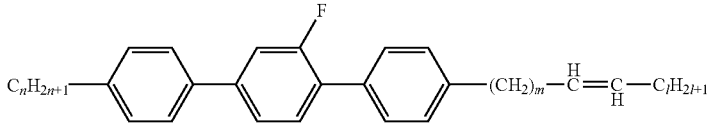
PGP-n-mVI

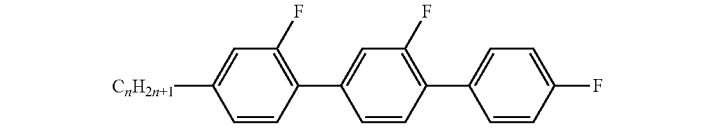
GGP-n-F

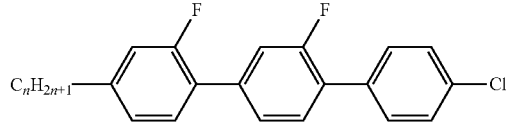
GGP-n-CL

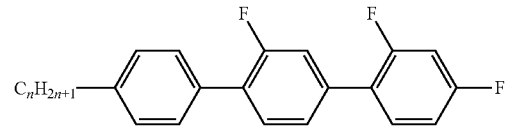
PGIGI-n-F

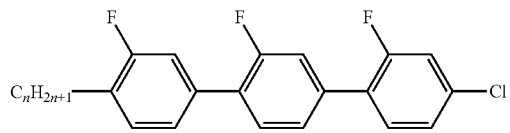
PGIGI-n-CL

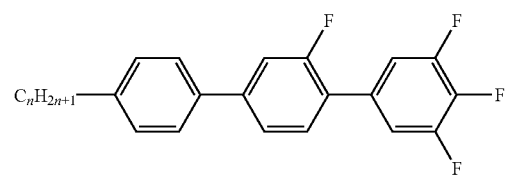
PGU-n-F

Having four 6-membered rings

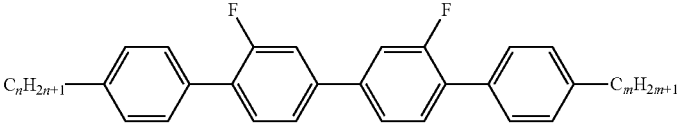
PGIGP-n-m

TABLE D-continued
Illustrative structures
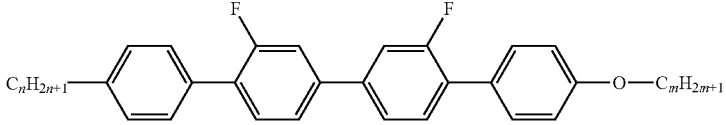 PGIGP-n-Om
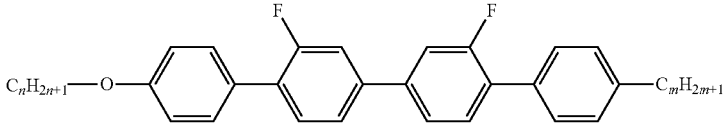 PGIGP-nO-m
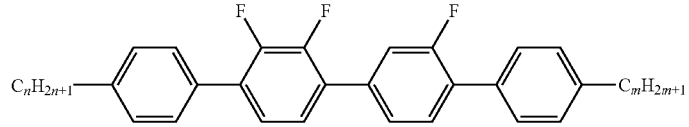 PYGP-n-m
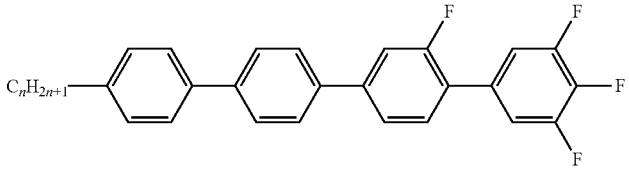 PPGU-n-F
Illustrative structures of neutral compounds preferably employed:
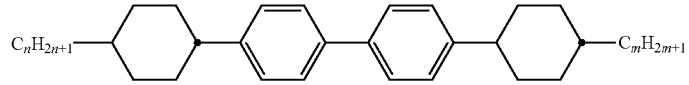 CPPC-n-m
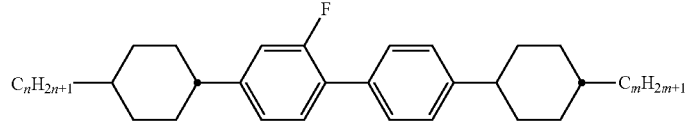 CGPC-n-m
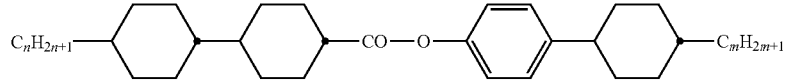 CCZPC-n-m
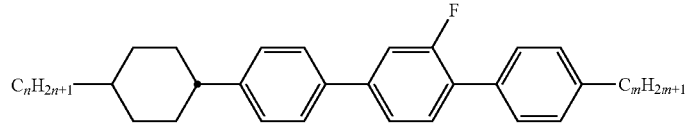 CPGP-n-m
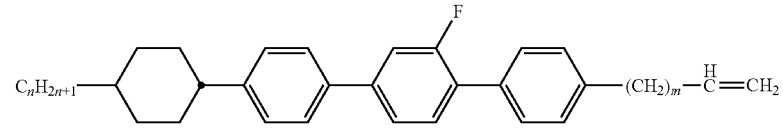 CPGP-n-mV
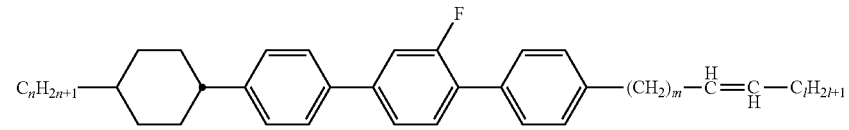 CPGP-n-mVI
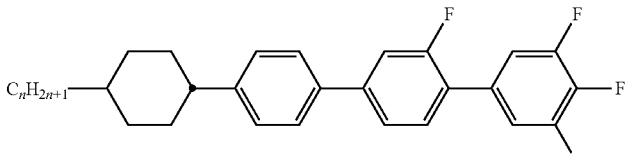 CPGU-n-F TABLE D-continued
Illustrative structures
Illustrative structures of further compounds employed:
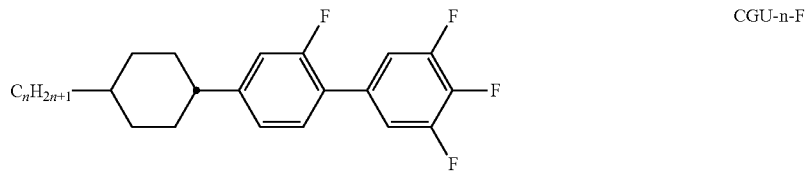 CGU-n-F
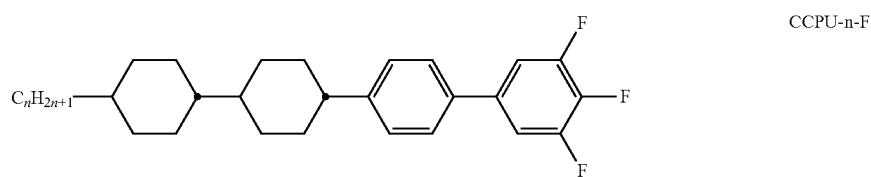 CCPU-n-F
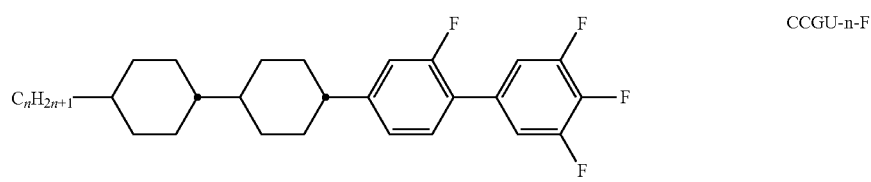 CCGU-n-F
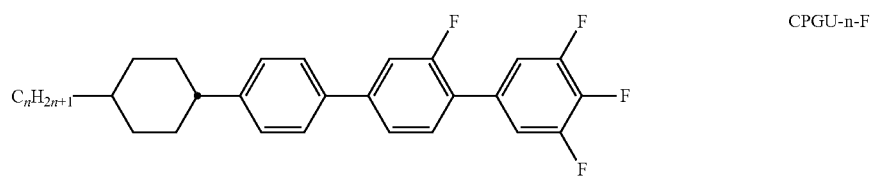 CPGU-n-F
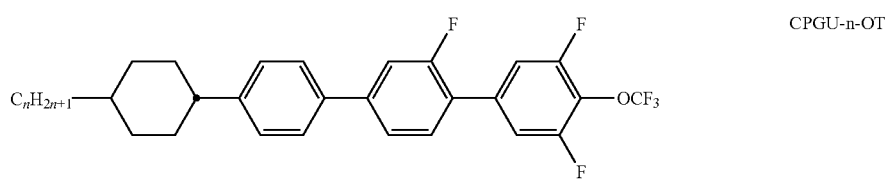 CPGU-n-OT
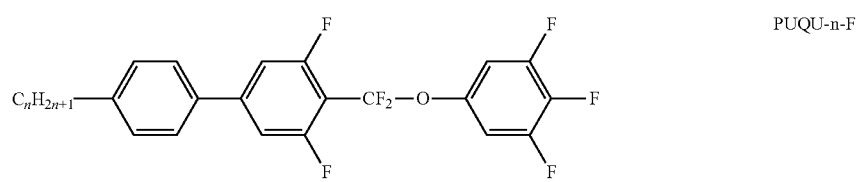 PUQU-n-F
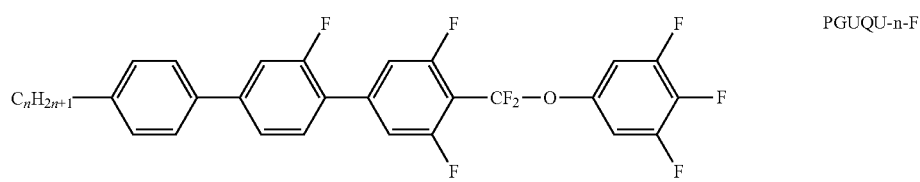 PGUQU-n-F The following table, Table E, shows illustrative compounds which can be used as stabiliser in the mesogenic media in accordance with the present invention. The total concentration of these and similar compounds in the media is preferably 5% or less.
TABLE E
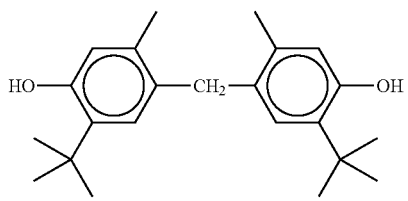
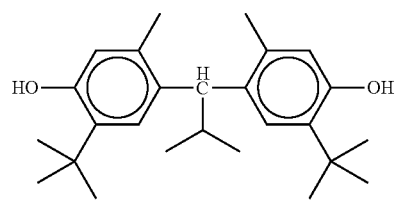
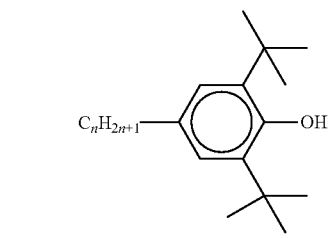
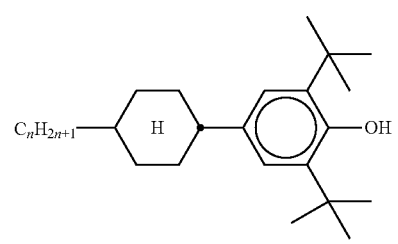
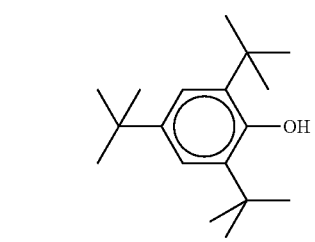
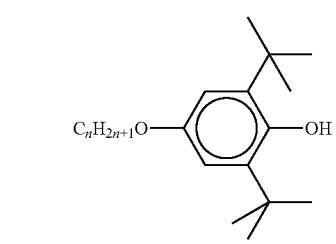
TABLE E-continued
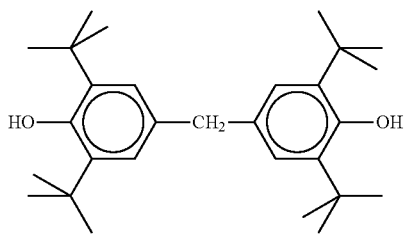
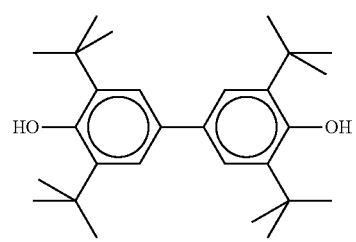
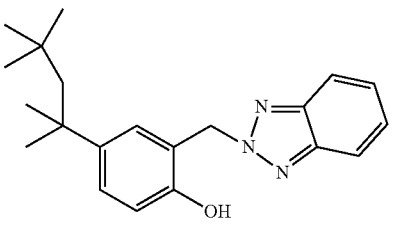 [SMILES: CC(C)(C)CC(C)(C)c1ccc(O)c(Cn2nc3ccccc3n2)c1]
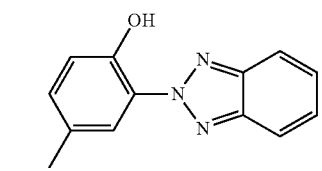 [SMILES: Cc1ccc(O)c(-n2nc3ccccc3n2)c1]
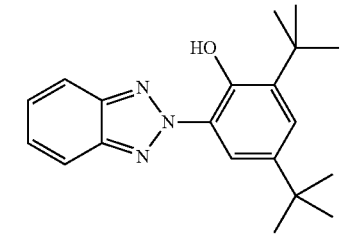 [SMILES: CC(C)(C)c1cc(-n2nc3ccccc3n2)c(O)c(C(C)(C)C)c1]
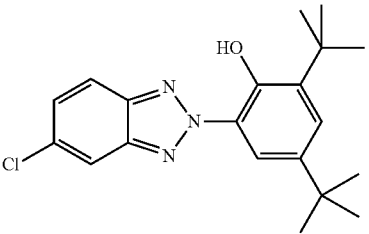 [SMILES: CC(C)(C)c1cc(-n2nc3ccc(Cl)cc3n2)c(O)c(C(C)(C)C)c1]

TABLE E-continued
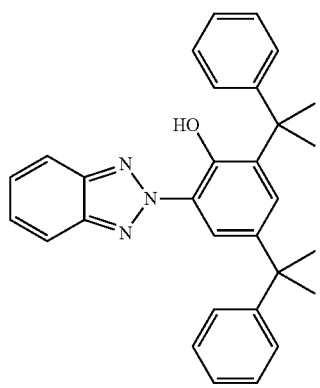 [SMILES: CC(C)(c1ccccc1)c1cc(-n2nc3ccccc3n2)c(O)c(C(C)(C)c2ccccc2)c1]
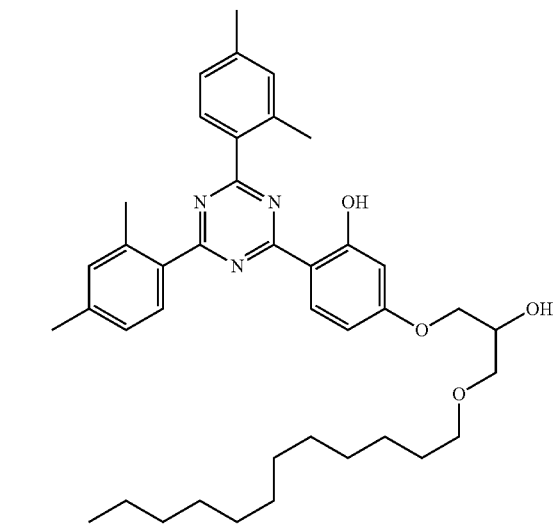
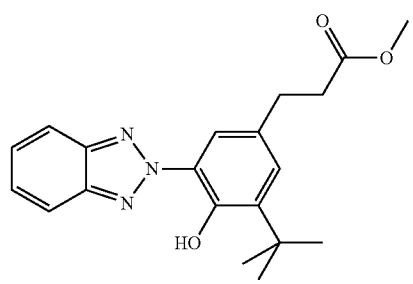 [SMILES: COC(=O)CCc1cc(-n2nc3ccccc3n2)c(O)c(C(C)(C)C)c1]
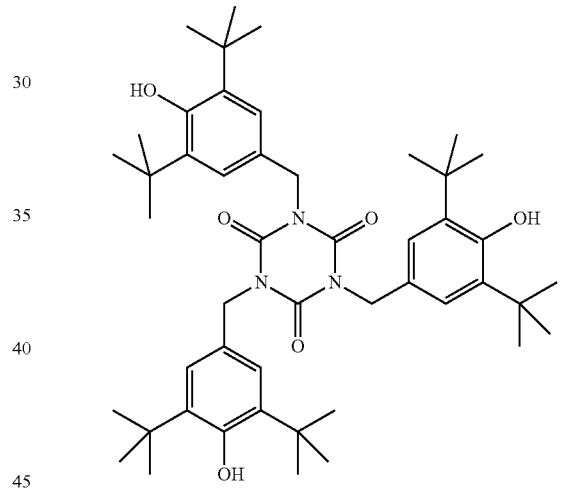
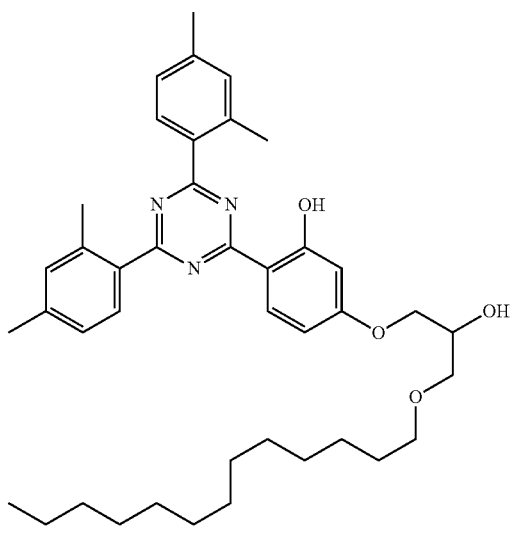 [SMILES: CCCCCCCCCCCCCOCC(O)COc1ccc(-c2nc(-c3ccc(C)cc3C)nc(-c3ccc(C)cc3C)n2)c(O)c1]
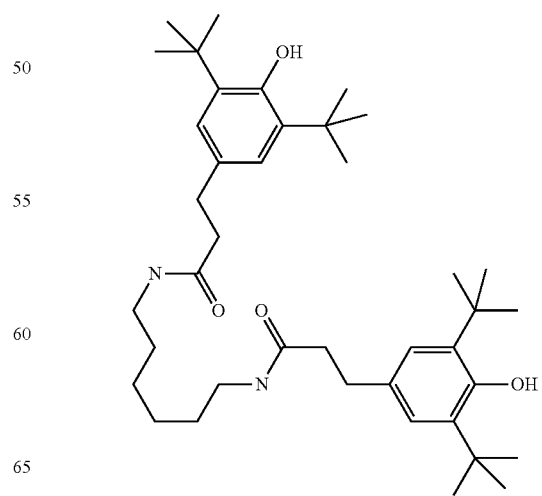

TABLE E-continued

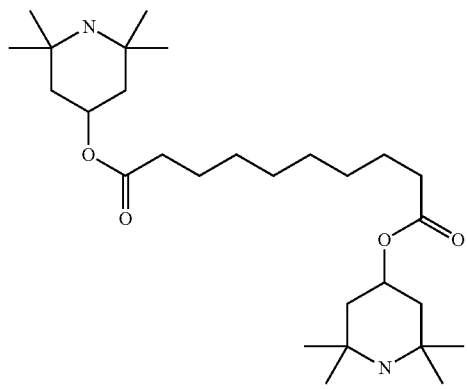

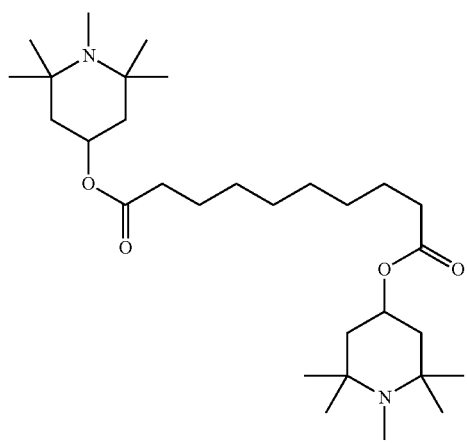

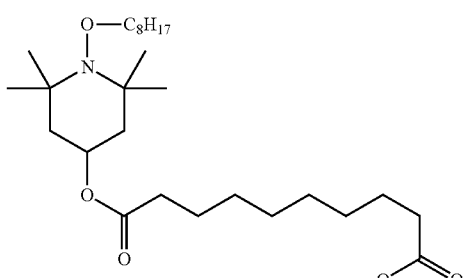

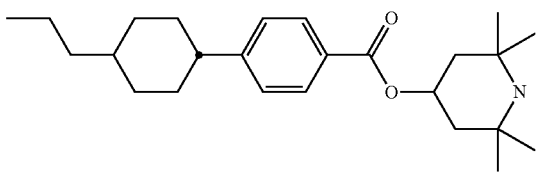

TABLE E-continued

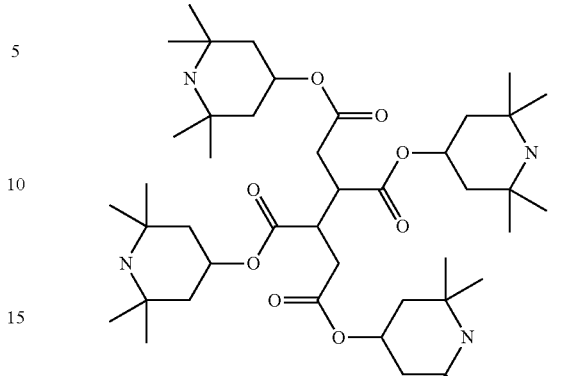

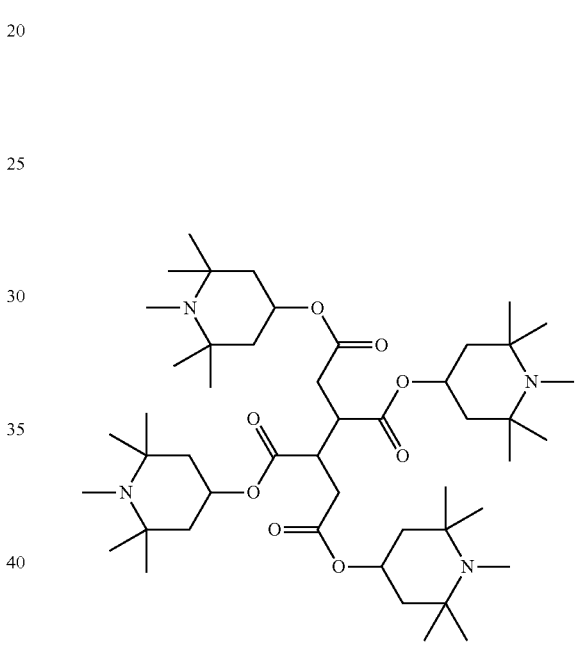

In a preferred embodiment of the present invention, the mesogenic media comprise one or more compounds selected from the group of the compounds from Table E.

The following table, Table F, shows illustrative compounds which can preferably be used as chiral dopants in the mesogenic media in accordance with the present invention.

TABLE F

| Structure | Label |
|---|---|
| C₂H₅—*CH(CH₃)—CH₂O—C₆H₄—C₆H₄—CN | C 15 |
| C₂H₅—*CH(CH₃)—CH₂—C₆H₄—C₆H₄—CN | CB 15 |
| C₆H₁₃—*CH(CH₃)—O—C₆H₄—C(=O)O—C₆H₄—C₅H₁₁ | CM 21 |
| C₃H₇—Cy—Cy—C₆H₄—CH₂—*CH(CH₃)—C₂H₅ | CM 44 |
| C₅H₁₁—C₆H₄—C₆H₄—C(=O)O—*CH(C₂H₅)—C₆H₅ | CM 45 |
| C₈H₁₇O—C₆H₄—C₆H₄—C(=O)O—*CH(C₂H₅)—C₆H₅ | CM 47 |
| Cholesteryl chloride | CC |
| Cholesteryl nonanoate (C₈H₁₇C(=O)O-cholesteryl) | CN |
| C₆H₁₃O—C₆H₄—C(=O)O—C₆H₄—C(=O)O—*CH(CH₃)—C₆H₁₃ | R/S-811 |

TABLE F-continued

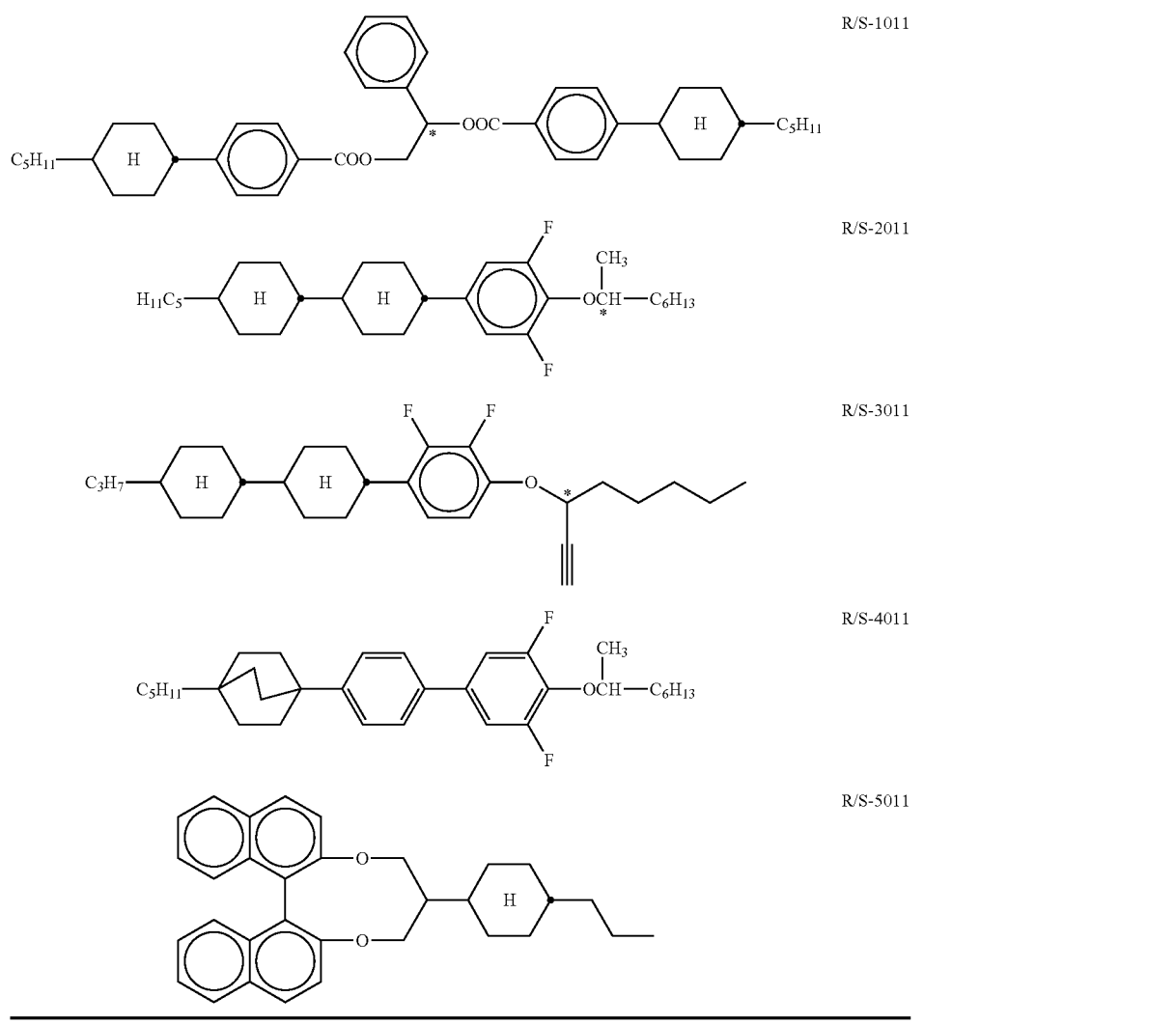

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise seven or more, preferably eight or more, compounds, preferably compounds having three or more, preferably four or more, different formulae, selected from the group of the compounds from Table D.

The following examples illustrate the present invention without limiting it in any way.

However, it becomes clear to the person skilled in the art from the physical properties what properties can be achieved and in what ranges they can be modified. In particular, the combination of the various properties which can preferably be achieved is thus well defined for the person skilled in the art.

EXAMPLES

Synthesis Example 1

1,4-Bis(2-(4-butylphenyl)ethynyl)-2-cyclopropylbenzene

1

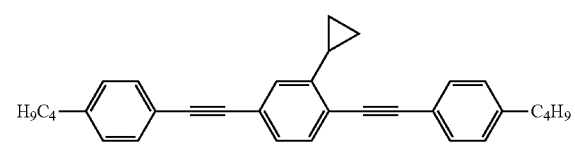

1.1) 1,4-Dichloro-2-cyclopropylbenzene 2

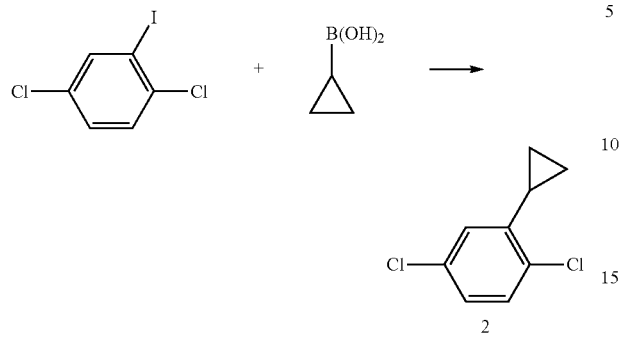

20 g (73 mmol) of 1,4-dichloro-2-iodobenzene, 9.4 g (110 mmol) of cyclopropylboronic acid, 32 g (147 mmol) of potassium phosphate, 421 mg (0.7 mmol) of bis(dibenzylideneacetone)palladium(0) (Pd(dba)$_2$) and 1096 mg (1.5 mmol) of 1,2,3,4,5-pentaphenyl-1-(di-t-butylphosphine)ferrocene (CTC-Q-PHOS) are dissolved in 600 ml of toluene and heated at 100° C. overnight. 100 ml of water are added to the cooled solution, and the mixture is extracted twice with toluene (100 ml). The combined organic phases are washed with water, dried over sodium sulfate and evaporated in vacuo. The residue is purified by column chromatography, giving the title compound as a colourless solid.

1.2) 1,4-Bis(2-(4-butylphenyl)ethynyl)-2-cyclopropylbenzene (1)

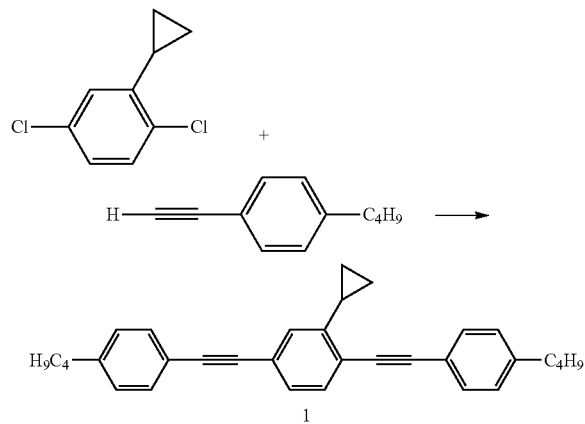

5 g (26 mmol) of 1,4-dichloro-2-cyclopropylbenzene, 9.4 g (58 mmol) of 1-n-butyl-4-ethynylbenzene, 19 g (58 mmol) of caesium carbonate, 69 mg (0.3 mmol) of bis(acetonitrile) palladium(II) chloride and 382 mg (0.8 mmol) of 2-dicyclohexylphosphino-2',4',6'-triisopropylbiphenyl are dissolved in 80 ml of dioxane under nitrogen and heated at 100° C. overnight. 100 ml of water are added to the cooled solution, and the mixture is extracted twice with methyl t-butyl ether (100 ml). The combined organic phases are washed with water, dried over sodium sulfate and evaporated in vacuo. The residue is purified by column chromatography and recrystallised from ethanol, giving the title compound 1 as a solid.

C 72 N 84.5 I.
Δε 1.5
Δn 0.378
γ$_1$ 2194 mPa·s
$^1$H-NMR (250 MHz, CDCl$_3$): 7.4-7.08 (11H, m); 2.5 (4H, m); 1.6-1.3 (9H, m); 0.96 (6H, m); 0.6-0.4 (4H, m).

Synthesis Example 2

1,4-Bis(2-(4-butylphenyl)ethynyl)-2-cyclobutyl-benzene 3

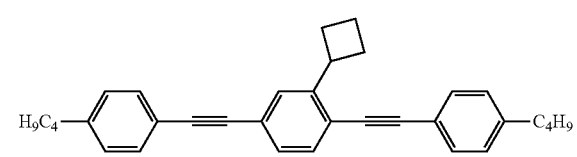

2.1) 1-(2,5-Dibromobenzene)cyclobutanol 4

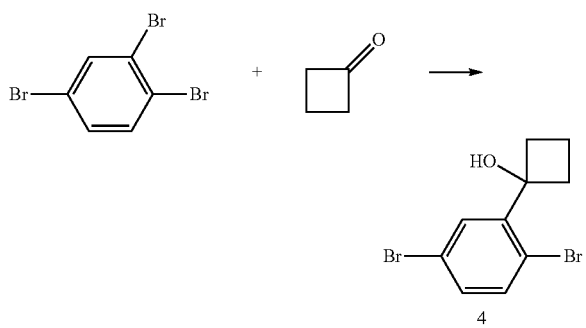

21.09 g (67 mmol) of 1,2,4-tribromobenzene are initially introduced in 100 ml of THF under nitrogen, cooled to −45° C., and a solution (1.3 M) of 51.54 ml (67 mmol) of isopropylmagnesium chloride/lithium chloride complex in THF is added dropwise. After 1 hour, the batch is warmed to −10° C., and 5 ml (66.34 ml) of cyclobutanone are added dropwise at this temperature. The batch is allowed to thaw, and sat. NH$_4$Cl solution is added, the mixture is extracted with methyl t-butyl ether, the organic phase is dried over sodium sulfate and filtered, the solvent is removed in vacuo, and the residue is filtered through silica gel with dichloromethane, giving 4, which is employed in the next step without further purification.

2.2) 1,4-Dibromo-2-cyclobutylbenzene 5

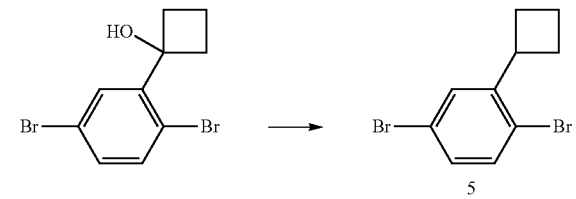 [SMILES: OC1(c2cc(Br)ccc2Br)CCC1 ; Brc1ccc(Br)c(C2CCC2)c1]

14.5 g (47.39 mmol) of 4 are dissolved in 50 ml of THF under nitrogen, and 35.72 ml (284.4 mmol) of boron trifluoride/diethyl ether complex are added dropwise at room temperature, and 12.54 g (189.6 mmol) of sodium cyanoborohydride are added in portions. The batch is heated under reflux overnight. The batch is allowed to cool to room temperature, sat. NaHCO₃ solution is added, the mixture is extracted with methyl t-butyl ether, the organic phase is dried over sodium sulfate and filtered, the solvent is removed in vacuo, and the residue is filtered through silica gel with 1-chlorobutane, giving 5 as a yellow liquid.

2.3) 1,4-Bis(2-(4-butylphenyl)ethynyl)-2-cyclobutyl-benzene 3

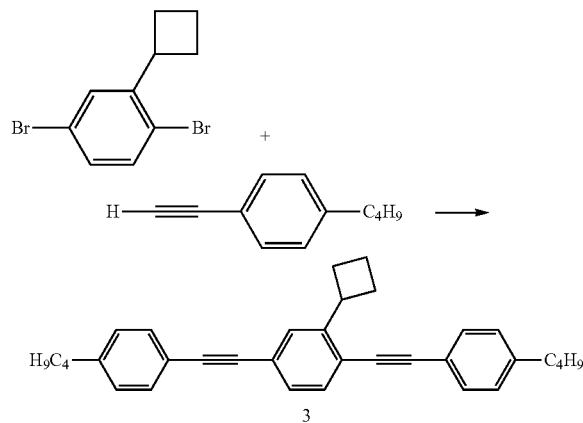

7.8 g (47.0 mmol) of 1-butyl-4-ethynylbenzene are initially introduced in 100 ml of THF under nitrogen, cooled to −78° C., and 63.32 ml (63.20 mmol) of a 1M solution of lithium bis(trimethylsilyl)amide in hexane are added dropwise. After 1 hour, 63.22 ml (63.20 mmol) of a 1M solution of 9-methoxy-9-BBN in hexane are added, and the mixture is left to stir at −78° C. for 2 hours. In a second apparatus, 6.8 g (23.45 mmol) of 5, 0.916 g (1.0 mmol) of tris(dibenzylideneacetone)dipalladium(0) and 1.64 g (4.0 mmol) of 2-dicyclohexylphosphino-2',6'-dimethoxybiphenyl are initially introduced in 100 ml of THF. The first solution is slowly added dropwise, and the batch is heated at 100° C. overnight. 100 ml of water are added to the cooled solution, and the mixture is extracted twice with methyl t-butyl ether (100 ml). The combined organic phases are washed with water, dried over sodium sulfate and evaporated in vacuo. The residue is purified by column chromatography and recrystallised from isopropanol, giving the title compound 3 as a solid.

Tg −39 C 69 N 70 I.

Δε 0.9

Δn 0.359

γ₁ 3067 mPa·s

Synthesis Example 3

2-Cyclohexyl-4-(4-hexylbenzeneethynyl)-1-(4-propyl-benzeneethynyl)benzene 6

3.1) 4-Chloro-2-cyclohexylbenzene trifluoromethanesulfonate 7

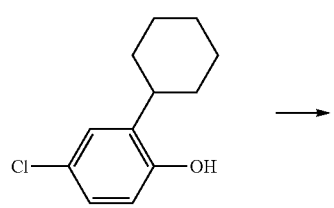

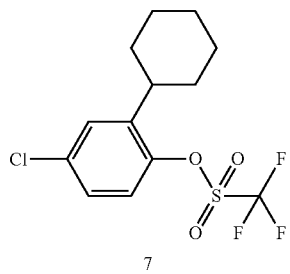

19 g (90.2 mmol) of 4-chloro-2-cyclohexylphenol, 4.64 ml (33.18 mmol) of triethylamine and 223 mg (1.8 mmol) of 4-(dimethylamino)pyridine are dissolved in 264 ml of dichloromethane, the mixture is cooled to −5° C., and 29.6 ml (180 mmol) of trifluoromethanesulfonic anhydride are added dropwise. The batch is stirred overnight at room temperature and filtered through silica gel with dichloromethane, giving the product 7, which is employed in the next step without further purification.

3.2) (4-Chloro-2-cyclohexylbenzeneethynyl)trimethylsilane 8

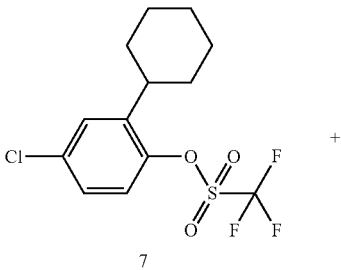

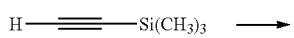

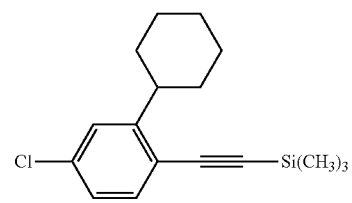

21 g (61.3 mmol) of 7, 25.8 ml (183.8 mmol) of trimethylsilylacetylene, 2.15 g (3 mmol) of bis(triphenylphosphine)palladium(II) chloride and 21.2 ml (153.2 mmol) of triethylamine are dissolved in 60 ml of N,N-dimethylformamide under nitrogen and heated at 100° C. overnight. 100 ml of water are added to the cooled solution, and the mixture is extracted twice with methyl t-butyl ether (100 ml). The combined organic phases are washed with water, dried over sodium sulfate and evaporated in vacuo. The residue is purified by column chromatography, giving the product 8, which is employed in the next step without further purification.

3.3) 4-Chloro-2-cyclohexyl-1-ethynylbenzene 9

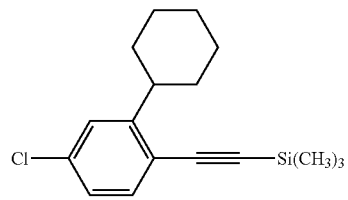

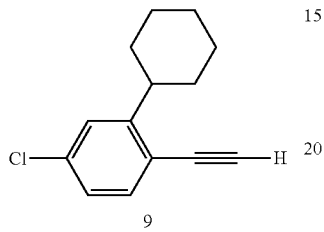

16.6 g (57.1 mmol) of 8 are dissolved in 154 ml of tetrahydrofuran, cooled to 0° C., and a 1M solution of tetra-n-butylammonium fluoride (68.48 mmol) is added dropwise. The batch is stirred overnight at room temperature, water is added, the mixture is extracted with methyl t-butyl ether, the organic phase is dried over sodium sulfate and filtered, the solvent is removed in vacuo, and the residue is filtered through silica gel with heptane/toluene, giving the product 9, which is employed in the next step without further purification.

3.4) 4-Chloro-2-cyclohexyl-1-p-tolylethynylbenzene 10

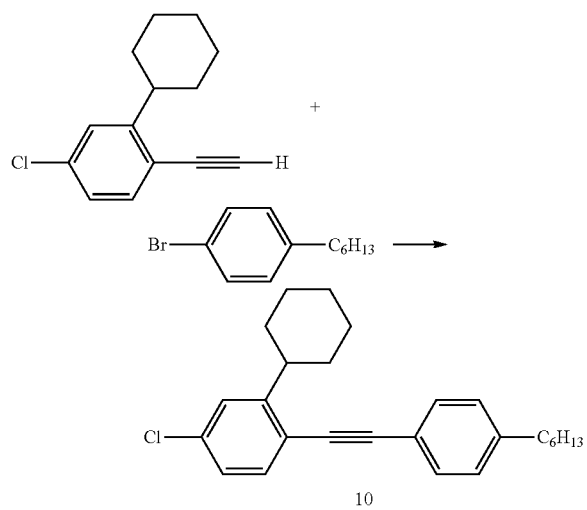

6.6 g (30.17 mmol) of 9, 7.28 g (30.17 mmol) of 1-bromo-4-hexylbenzene, 21.63 g (66.39 mmol) of caesium carbonate, 78 mg (0.3 mmol) of bis-(acetonitrile)palladium(II) chloride and 431 mg (0.9 mmol) of 2-dicyclohexylphosphino-2',4',6'-triisopropylbiphenyl are dissolved in 90 ml of dioxane under nitrogen and heated at 100° C. overnight. 100 ml of water are added to the cooled solution, and the mixture is extracted twice with methyl t-butyl ether (100 ml). The combined organic phases are washed with water, dried over sodium sulfate and evaporated in vacuo. The residue is purified by column chromatography.

3.5) 2-Cyclohexyl-4-(4-hexylphenylethynyl)-1-(4-propylphenylethynyl)-benzene 6

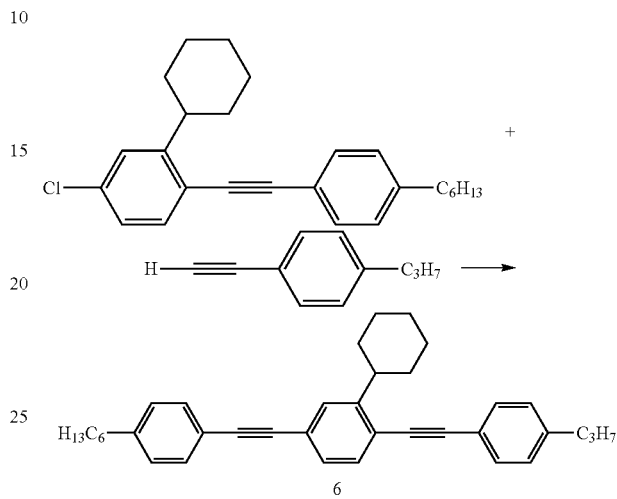

4.5 g (11.87 mmol) of 10, 1.7 g (11.87 mmol) of 1-n-propyl-4-ethynyl-benzene, 8.5 g (26.12 mmol) of caesium carbonate, 30 mg (0.1 mmol) of bis(acetonitrile)palladium (II) chloride and 170 mg (0.35 mmol) of 2-dicyclohexylphosphino-2',4',6'-triisopropylbiphenyl are dissolved in 35 ml of dioxane under nitrogen and heated at 100° C. overnight. 100 ml of water are added to the cooled solution, and the mixture is extracted twice with methyl t-butyl ether (100 ml). The combined organic phases are washed with water, dried over sodium sulfate and evaporated in vacuo. The residue is purified by column chromatography, giving the title compound 6 as a solid.

Δε −0.6

Δn 0.294

$\gamma_1$ 5884 mPa·s

Synthesis Example 4

2-Cyclohexyl-4-(4-hexyl-2-fluorobenzeneethynyl)-1-(4-propylbenzeneethynyl)benzene 7

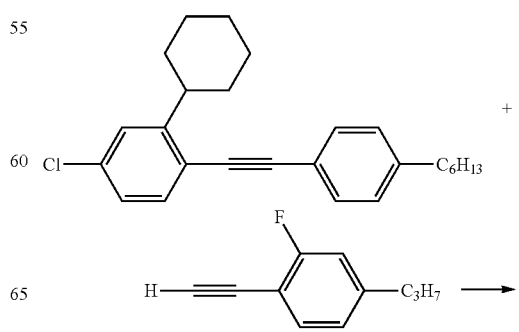

-continued

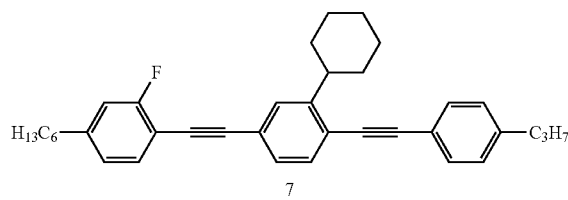

7

The title compound is prepared analogously to Synthesis Example 3.

Synthesis Example 5

2-Cyclopropyl-4-(4-butylbenzeneethynyl)-1-(3,4,5-trifluoro-benzeneethynyl)benzene 8

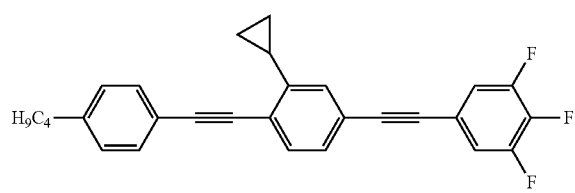

8

The title compound is prepared analogously to Synthesis Example 3 starting from 4-chloro-2-cyclopropylbenzene trifluoromethanesulfonate using 3,4,5-trifluorobromobenzene.

C 84 I
Δε 13
Δn 0.316
γ₁ 687 mPa·s

Synthesis Example 6

2-Cyclopropyl-4-(4-hexylbenzeneethynyl)-1-(4-propyl-benzeneethynyl)benzene 9

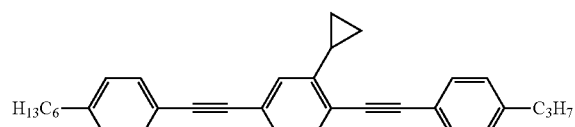

9

The title compound is prepared analogously to Synthesis Example 3.

Tg −43 C 46 N 86 I
Δε 1.1
Δn 0.379
γ₁ 3138 mPa·s

Synthesis Example 7

2-Cyclopropyl-4-(4-hexylbenzeneethynyl)-1-(4-propyl-benzeneethynyl)benzene 10

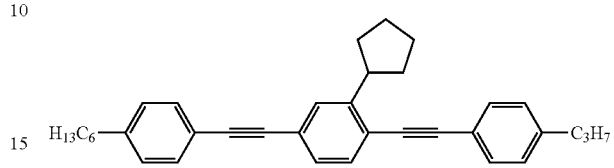

10

The title compound is prepared analogously to Synthesis Example 2.

Tg −36 C 57 N (7.0) I
Δε −0.1
Δn 0.334
γ₁ 4045 mPa·s

Mixture Example 1

A liquid-crystal mixture M-1 having the composition and properties as indicated in the following table is prepared.

| Composition Compound | | |
|---|---|---|
| No. | Abbreviation | |
| 1 | PPTUI-3-2 | 20% |
| 2 | PPTUI-3-4 | 20% |
| 3 | PPTUI-4-4 | 5% |
| 4 | GGP-3-CL | 10% |
| 5 | GGP-5-CL | 20% |
| 6 | CPGP-5-2 | 5% |
| 7 | CPGP-5-3 | 5% |
| 8 | (1) | 15% |
| Σ | | 100% |
| Physical properties | | |
| T(N, I) = | | 152° C. |
| T(S, N) = | | −20° C. |
| Δn (20° C., 589.3 nm) = | | 0.301 |
| Δε (20° C., 1 kHz) = | | 4.1 |
| ε∥ (20° C., 1 kHz) | | 7.6 |

This mixture is very highly suitable for applications in the microwave range, in particular for phase shifters. The material quality (η) is increased compared with conventional mixtures.

Further combinations of the embodiments and variants of the invention in accordance with the description also arise from the following claims.

The invention claimed is:
1. Compounds of the formula I

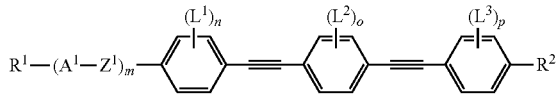

in which
L$^1$ to L$^3$, independently of one another, denote F, Cl, C$_1$- to C$_{10}$-alkyl or a meaning in accordance with R$^x$, where one or more of the radicals L$^1$ to L$^3$ denote an R$^x$,
n, o, p, independently of one another, denote 0, 1, 2, 3 or 4,
R$^x$ denotes cyclopropyl, cyclobutyl, cyclopentyl or cyclohexyl,
R$^1$ and R$^2$, independently of one another, denote H, a halogenated or unsubstituted alkyl radical having 1 to 15 C atoms, where, in addition, one or more CH$_2$ groups in these radicals may each be replaced, independently of one another, by —C≡C—, —CH=CH—, —CF=CF—, —(CO)O—, —O(CO)—, —(CO)— or —O— in such a way that O atoms are not linked directly to one another, F, Cl, Br, CN, CF$_3$, OCF$_3$, SCN, NCS or SF$_5$,
A$^1$ denotes
  a) trans-1,4-cyclohexylene or cyclohexenylene, in which, in addition, one or two non-adjacent CH$_2$ groups may be replaced by —O— and/or —S— and in which H may be replaced by F,
  b) 1,4-phenylene, in which one or two CH groups may be replaced by N and in which, in addition, one or more H atoms may be replaced by Br, Cl, F, CN, R$^x$, C$_1$-C$_{10}$ alkyl, C$_1$-C$_{10}$ alkoxy or a mono-or polyfluorinated C$_1$-C$_{10}$ alkyl or alkoxy group,
  or
  c) a radical from the group 1,4-bicyclo[2.2.2]octylene, cyclobut-1,3-diyl, spiro[3.3]heptane-2,6-diyl, thiophene-2,5-diyl,

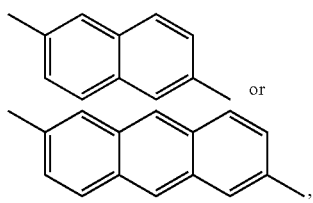

in which one or more CH groups may be replaced by N, one or more H atoms may be replaced by Br, Cl, F, CN, R$^x$, C$_1$-C$_{10}$ alkyl, C$_1$-C$_{10}$ alkoxy or a mono- or polyfluorinated C$_1$-C$_{10}$ alkyl or alkoxy group, and one or more double bonds may be replaced by single bonds,
Z$^1$ denotes a single bond, —C≡C—, —CH=CH—, —CH$_2$O—, —(CO)O—, —CF$_2$O—, —CF$_2$CF$_2$—, —CH$_2$CF$_2$—, —CH$_2$CH$_2$—, —(CH$_2$)$_4$—, —CH=CF— or —CF=CF—, where asymmetrical bridges may be oriented to both sides, and
m denotes 0, 1 or 2.

2. Compounds according to claim 1, characterised in that one, two or three of the radicals L$^1$ to L$^3$ denote a radical R$^x$.

3. Compounds according to claim 1, characterised in that m is 0.

4. Compounds according to claim 1, characterised in that precisely one radical L$^2$ denotes a radical R$^x$.

5. A component for high-frequency technology comprising a compound of the formula I according to claim 1.

6. Liquid-crystal medium, characterised in that it comprises one or more compounds of the formula I according to claim 1.

7. Liquid-crystal medium according to claim 6, characterised in that it additionally comprises one or more compounds selected from the compounds of the formulae II, III and/or IV:

in which
L$^{11}$ denotes R$^{11}$ or X$^{11}$,
L$^{12}$ denotes R$^{12}$ or X$^{12}$,
R$^{11}$ and R$^{12}$, independently of one another, denote H, unfluorinated alkyl or unfluorinated alkoxy having 1 to 15 C atoms or unfluorinated alkenyl, unfluorinated alkenyloxy or unfluorinated alkoxyalkyl having 2 to 15 C atoms,
X$^{11}$ and X, independently of one another, denote H, F, Cl, —CN, —NCS, —SF$_5$, fluorinated alkyl or fluorinated alkoxy having 1 to 7 C atoms or fluorinated alkenyl, fluorinated alkenyloxy or fluorinated alkoxyalkyl having 2 to 7 C atoms, and

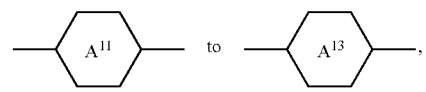

independently of one another, denote

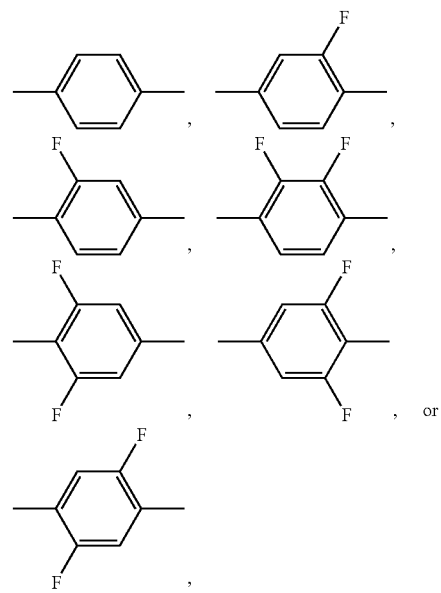

-continued

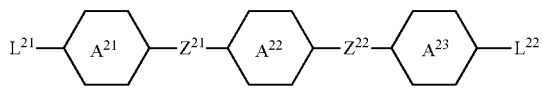

III in which
L$^{21}$ denotes R$^{21}$ and, in the case where Z$^{21}$ and/or Z$^{22}$ denote trans-CH=CH— or trans-CF=CF—, alternatively denotes X$^{21}$,
L$^{22}$ denotes R$^{22}$ and, in the case where Z$^{21}$ and/or Z$^{22}$ denote trans-CH=CH— or trans-CF=CF—, alternatively denotes X$^{22}$,
R$^{21}$ and R$^{22}$, independently of one another, denote H, unfluorinated alkyl or unfluorinated alkoxy having 1 to 17 preferably 3 to 10 C atoms or unfluorinated alkenyl, unfluorinated alkenyloxy or unfluorinated alkoxyalkyl having 2 to 15 preferably 3 to 10, C atoms,
X$^{21}$ and X$^{22}$, independently of one another, denote F or Cl, —CN, —NCS, —SF$_5$, fluorinated alkyl or fluorinated alkoxy having 1 to 7 C atoms or fluorinated alkenyl, fluorinated alkenyloxy or fluorinated alkoxyalkyl having 2 to 7 C atoms
one of
Z$^{21}$ and Z$^{22}$ denotes trans-CH=CH—, trans-CF=CF— or —C≡C— and the other, independently thereof, denotes trans-CH=CH—, trans-CF=CF—or a single bond, and

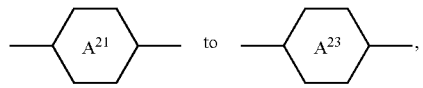

independently of one another, denote

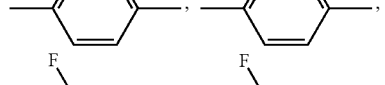

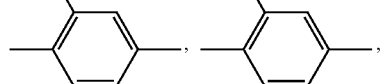

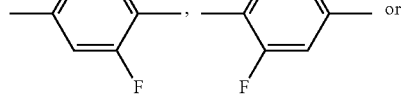

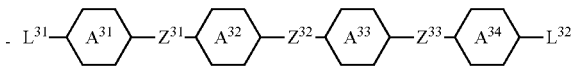

IV in which
L$^{31}$ denotes R$^{31}$ or X$^{31}$,
L$^{32}$ denotes R$^{32}$ or X$^{32}$,
R$^{31}$ and R$^{32}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
X$^{31}$ and X$^{32}$, independently of one another, denote H, F, Cl, —CN, —NCS, —SF$_5$, fluorinated alkyl or fluorinated alkoxy having 1 to 7 C atoms or fluorinated alkenyl, fluorinated alkenyloxy or fluorinated alkoxyalkyl having 2 to 7 C atoms, and
Z$^{31}$ to Z$^{33}$, independently of one another, denote trans-CH=CH—, trans-CF=CF—, —C≡C— or a single bond, and

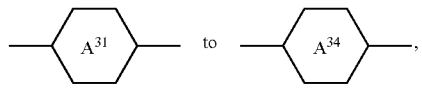

independently of one another, denote

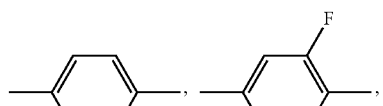

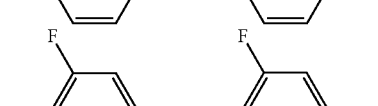

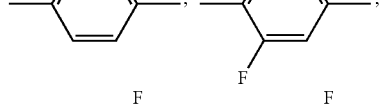

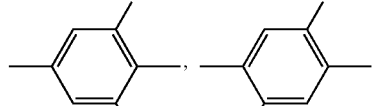

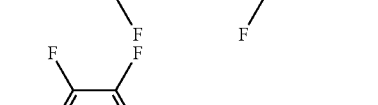

8. Liquid-crystal medium according to Claim 7, characterised in that it comprises one or more compounds of the formula II.

9. Liquid-crystal medium according to claim 7, characterised in that it comprises one or more compounds of the formula III.

10. Liquid-crystal medium according to claim 7, characterised in that it comprises one or more compounds of the formula IV.

11. Liquid-crystal medium according to claim 6, characterised in that the concentration of the compounds of the formula I in the medium is in the range from in total 5% to 90%.

12. Liquid-crystal medium according to claim 7, characterised in that it comprises one or more compounds selected from the group of the compounds of the formulae II-1 to II-3:

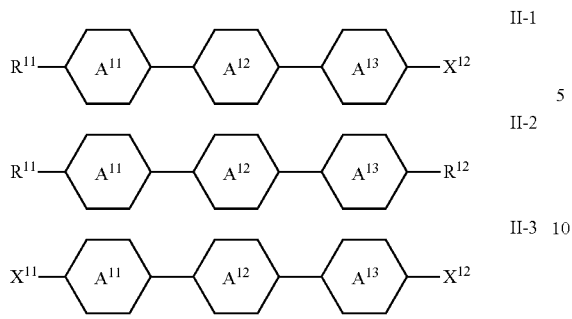

II-1

II-2

II-3 in which the parameters have the respective meanings given in for the compound of formula II.

13. Process for the preparation of a liquid-crystal medium according to claim 7, characterised in that one or more compounds of the formula I are mixed with one or more compounds selected from the group of the compounds of the formulae II, III and IV and optionally with one or more further compounds and optionally with one or more additives.

14. Component for high-frequency technology, characterised in that it comprises a liquid-crystal medium according to claim 6.

15. Component according to claim 14, characterised in that it comprises one or more functionally connected phase shifters.

16. Phase-controlled group antenna, characterised in that it comprises one or more components according to claim 14.

\* \* \* \* \*

UNITED STATES PATENT AND TRADEMARK OFFICE
CERTIFICATE OF CORRECTION

PATENT NO. : 8,557,142 B2  Page 1 of 1
APPLICATION NO. : 13/497909
DATED : October 15, 2013
INVENTOR(S) : Elvira Montenegro et al.

It is certified that error appears in the above-identified patent and that said Letters Patent is hereby corrected as shown below:

IN THE CLAIMS:

Column 70, line 30 (Claim 7) reads: -- $X^{11}$ and X, independently of one another, denote H, F, Cl, --.

Should read: -- $X^{11}$ and $X^{12}$, independently of one another, denote H, F, Cl, --.

Column 73, line 16 (Claim 12) reads: -- in for the compound of formula II. --.

Should read: -- for the compound of formula II. --.

Signed and Sealed this
Twenty-eighth Day of January, 2014

Michelle K. Lee
*Deputy Director of the United States Patent and Trademark Office*